(12) United States Patent
Terunuma et al.

(10) Patent No.: US 6,731,474 B2
(45) Date of Patent: May 4, 2004

(54) THIN FILM MAGNETIC HEAD AND METHOD OF MANUFACTURING THE SAME

(75) Inventors: Koichi Terunuma, Tokyo (JP); Ken-ichi Takano, Tokyo (JP); Noriyuki Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 228 days.

(21) Appl. No.: 09/991,994

(22) Filed: Nov. 26, 2001

(65) Prior Publication Data
US 2002/0126423 A1 Sep. 12, 2002

(30) Foreign Application Priority Data

Nov. 27, 2000 (JP) ........................... 2000-359022
Apr. 9, 2001 (JP) ........................... 2001-109904

(51) Int. Cl.[7] ............................. G11B 5/39; G11B 5/31
(52) U.S. Cl. ........................................... 360/319
(58) Field of Search ................................. 360/319, 321

(56) References Cited

U.S. PATENT DOCUMENTS

| 5,515,221 | A | * | 5/1996 | Gill et al. ............. 360/319 |
| 5,621,592 | A | | 4/1997 | Gill et al. |
| 5,761,011 | A | * | 6/1998 | Miyauchi et al. ............. 360/319 |
| 5,838,521 | A | * | 11/1998 | Ravipati ............. 360/319 |
| 5,850,325 | A | * | 12/1998 | Miyauchi et al. ............. 360/319 |
| 6,025,978 | A | * | 2/2000 | Hoshi et al. ............. 360/319 |
| 6,275,360 | B1 | * | 8/2001 | Nakamoto et al. ............. 360/319 |
| 6,278,590 | B1 | * | 8/2001 | Gill et al. ............. 360/317 |
| 6,292,334 | B1 | * | 9/2001 | Koike et al. ............. 360/319 |
| 6,430,009 | B1 | * | 8/2002 | Komaki et al. ............. 360/319 |
| 6,456,466 | B1 | * | 9/2002 | Nakamoto et al. ............. 360/319 |
| 6,456,467 | B1 | * | 9/2002 | Mao et al. ............. 360/319 |
| 6,515,837 | B1 | * | 2/2003 | Hamakawa et al. ............. 360/319 |

FOREIGN PATENT DOCUMENTS

| JP | 61258323 | A | * | 11/1986 | ............. G11B/5/39 |
| JP | 06084144 | A | * | 3/1994 | ............. G11B/5/39 |
| JP | 07169023 | A | * | 7/1995 | ............. G11B/5/39 |
| JP | 08036717 | A | * | 2/1996 | ............. G11B/5/39 |
| JP | 09091625 | A | * | 4/1997 | ............. G11B/5/39 |
| JP | A 9-274712 | | | 10/1997 | |
| JP | 11161920 | A | * | 6/1999 | ............. G11B/5/39 |
| JP | 11213347 | A | * | 8/1999 | ............. G11B/5/39 |
| JP | 2000137909 | A | * | 5/2000 | ............. G11B/5/39 |

* cited by examiner

Primary Examiner—William Klimowicz
(74) Attorney, Agent, or Firm—Oliff & Berridge, PLC

(57) ABSTRACT

Provided are a thin film magnetic head and a method of manufacturing the same, which is capable of high density recording and obtaining stable output. The thin film magnetic head includes an MR film sandwiched in between first and second shield layers. The first shield layer includes an inner layer, a magnetization stabilizing layer, an underlayer, and an outer layer laminated in order from the MR film. The second shield layer includes an inner layer, a magnetization stabilizing layer, an isolating layer, and an outer layer laminated in order from the MR film. The magnetization stabilizing layers are formed of antiferromagnetic material, so as to control the direction of magnetization of the inner layers.

11 Claims, 14 Drawing Sheets

THIN FILM MAGNETIC HEAD AND METHOD OF MANUFACTURING THE SAME

BACKGROUND OF THE INVENTION

1. Field of the Invention

The invention relates to a thin film magnetic head for use in a magnetic recording apparatus or the like such as a hard disk drive, and a method of manufacturing the same.

2. Description of the Related Art

In recent years, an improvement in performance of a thin film magnetic head has been sought in accordance with an increase in a surface recording density of a hard disk drive. A composite thin film magnetic head, which has a laminated structure comprising a reproducing head having a magnetoresistive element (hereinafter referred to as MR element), and a recording head having an inductive magnetic transducer, is widely used as the thin film magnetic head. The MR element has a single-layer or multi-layer magnetoresistive film (hereinafter referred to as MR film) indicating a change in resistance by sensing a signal magnetic field, and based on the change in resistance in the MR film, data is read out. As the MR film, a AMR film indicating Anisotropic Magnetoresistive effect (AMR effect) and a GMR film indicating Giant Magnetoresistive effect (GMR effect) are well known.

In general, many data elements (each of which is an area corresponding to 1 bit of information) are arranged on a track line formed on a magnetic medium, and a space between the data elements is extremely short. Thus, when reading out information of a data element, the MR film of the thin film magnetic head has to avoid being affected by other data elements adjacent to the data element. Therefore, the thin film magnetic head has a structure such that the MR film is sandwiched in between a pair of shield layers of magnetic material having high magnetic permeability. That is, undesired magnetic fluxes (namely, magnetic fluxes from adjacent data elements) mainly flow to the shield layers and do not flow to the MR film, and thereby, an undesired magnetic field is prevented from reaching to the MR film. Such an effect is called a shield effect. A space between the shield layers substantially corresponds to the space between the data elements.

In accordance with a recent increase in the surface recording density of the hard disk or the like, an arrangement density (i.e., a linear density) of the data elements on the track line tends to further increase. Accordingly, it is required that the space between the shield layers of the thin film magnetic head be further reduced. When the space between the shield layers is reduced in such manner, the shield layers and the MR film are arranged closer to one another. However, the shield layers may be affected by a magnetic field generated by the magnetic medium, which leads to random changes in the direction of magnetization. Therefore, there is a problem that when the shield layers and the MR film are arranged close to one another, the MR film is affected by changes in the directions of magnetization of the shield layers, and consequently, output of the thin film magnetic head will become unstable.

In order to solve such a problem, it has been proposed that each of the shield layers is made of a laminate having a ferromagnetic layer and an antiferromagnetic layer, and an exchange coupling between the ferromagnetic layer and the antiferromagnetic layer is used to completely fix the direction of magnetization of the shield layer (Japanese Unexamined Patent Publication No. Hei 9-274712 and U.S. Pat. No. 5,621,592).

However, when the directions of magnetization of shield layers are fixed in such manner, the magnetic permeability of the shield layers is declined, so that it is hard to flow an undesired magnetic flux to the shield layers, which results in a decline in the shield effect. There is a problem that when the shield effect of the shield layer is declined in such manner, the space between shield layers cannot be further reduced, so the thin film magnetic head is incapable of the high-density recording.

SUMMARY OF THE INVENTION

The present invention has been achieved in light of the foregoing problems. It is an object of the invention to provide a thin film magnetic head capable of high-density recording and stabilizing output, and a method of manufacturing the same.

A thin film magnetic head of the invention comprises: a functional film having a magnetic transducer function; a first gap film and a second gap film sandwiching the functional film in between, the first and second gap films each having electrical insulating properties; and a first shield layer and a second shield layer sandwiching the functional film with the first and second gap films in between, respectively, so as to prevent an undesired magnetic field from reaching to the functional film, wherein at least one of the first and second shield layers includes an inner layer having a controlled direction of magnetization, a magnetization stabilizing layer controlling the direction of magnetization of the inner layer, and an outer layer having a freely changeable direction of magnetization, laminated in order from the functional film.

In the thin film magnetic head, at least one of the first and second shield layers includes an inner layer having a controlled direction of the magnetization, provided nearest to the functional film. Thereby, in at least one of the first and second shield layers, it is hard to lead a change in magnetization in a region near the functional film. Further, in the outer layer, the direction of magnetization can be freely changed, so an undesired magnetic flux can be fed to the outer layer. Thereby, the shield effect preventing an undesired magnetic field from reaching to the functional film can be fully exerted.

In the thin film magnetic head according to the invention, the thickness of the inner layer is preferably from 10 nm to 300 nm inclusive. Further, the magnetization stabilizing layer preferably contains at least one of an antiferromagnetic material and a hard magnetic material. Moreover, an intermediate layer is preferably provided between the magnetization stabilizing layer and the outer layer. In addition, it is preferable that a thin magnetic head according to the invention further includes magnetic domain control films for applying a bias magnetic field to the functional film, the bias magnetic field controlling a magnetic domain of the functional film, and the direction of magnetization of the inner layer is nearly parallel in the same direction or nearly parallel in a reverse direction, with respect to a direction of the bias magnetic field applied to the functional film by the magnetic domain control films. Further, the functional film may include a nonmagnetic layer; a soft magnetic layer provided on a side of the nonmagnetic layer; a ferromagnetic layer provided on another side of the nonmagnetic layer opposite to the soft magnetic layer; and an antiferromagnetic layer provided on a side of the ferromagnetic layer opposite to nonmagnetic layer. In this case, it is preferable that the antiferromagnetic layer and the ferromagnetic layer are formed to induce an exchange coupling therebetween by a heat treatment at a first temperature, and the magnetization stabilizing layer and the inner layer are formed to to induce an exchange coupling therebetween by a heat treatment at a second temperature different from the first temperature.

Another thin film magnetic head according to the invention comprises: a functional film having a magnetic transducer function; a first insulating film and a second insulating film sandwiching the functional film in between, and a first magnetic layer and a second magnetic layer sandwiching the functional film with the first and second insulating films in between, respectively, wherein at least one of the first and second shield layers includes an inner layer and an outer layer laminated in order from the functional film, and an uniaxially anisotropic magnetic field in the outer layer is closer to 0 than an uniaxially anisotropic magnetic field in the inner layer.

In a method of manufacturing a thin film magnetic head according to the invention, the thin film magnetic head includes a functional film having a magnetic transducer function, a first shield layer and a second shield layer for preventing an undesired magnetic field from reaching to the functional film, and the method comprises the steps of: forming the first shield layer on a base with an insulating layer in between; forming a first gap film having electrical insulating properties on the first shield layer; forming the functional film on the first gap film; forming a second gap film having electrical insulating properties on the functional film; and forming the second shield layer on the second gap film, wherein in the steps of forming the first shield layer and forming the second shield layer, at least one of the first and second shield layers is formed so as to include an inner layer having a controlled direction of magnetization, a magnetization stabilizing layer controlling the direction of magnetization of the inner layer, and an outer layer having a freely changeable direction of magnetization, laminated in order from the functional film.

In a method of manufacturing a thin film magnetic head according to the invention, a thin film magnetic head is manufactured so as to include the first and second shielding layers, at least one of which includes an inner layer having a controlled direction of magnetization, a magnetization stabilizing layer controlling the direction of magnetization of the inner layer, and an outer layer having a freely changeable direction of magnetization, laminated in order from the functional film.

In a method of manufacturing a thin film magnetic head according to the invention, the magnetization stabilizing layer preferably contains at least one of an antiferromagnetic material and a hard magnetic material. Further, it is preferable that the inner layer and the magnetization stabilizing layer are continuously formed through a substantially same means of forming. Moreover, it is preferable that the magnetization stabilizing layer and the outer layer are discontinuously formed through different means of forming.

DETAILED DESCRIPTION OF THE PREFERRED EMBODIMENTS

[First Embodiment]
<Configuration of Magnetic Head Slider>
Firstly, with reference to FIG. 1 through FIG. 7, a configuration of a thin film magnetic head 1 according to a preferred embodiment of the invention will be described below.

Figure 1:
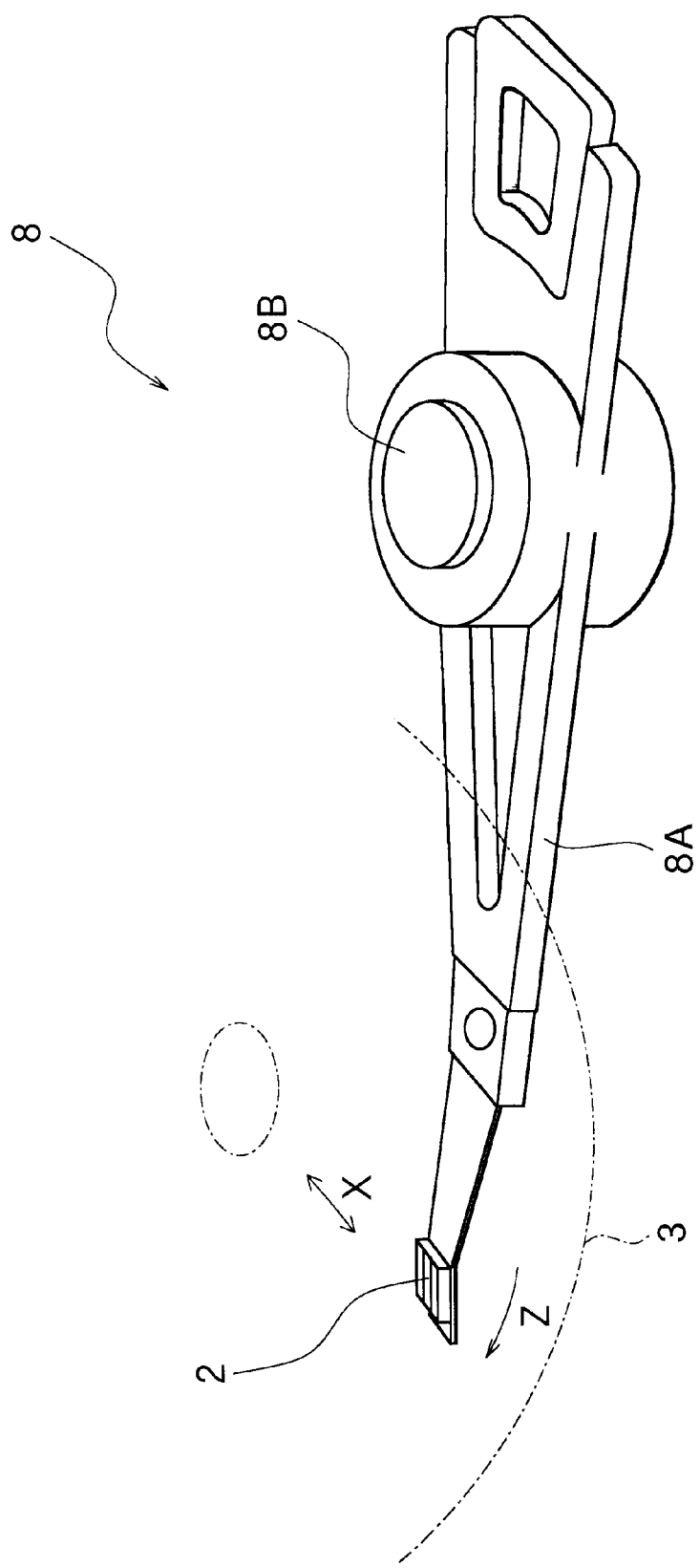
FIG. 1 is a perspective view of an appearance of a rotating arm on which a thin film magnetic head according to an embodiment of the invention is mounted.

FIG. 1 shows a configuration of a rotating arm 8 comprising the thin film magnetic head 1 according to the embodiment. The rotating arm 8 is used in, for example, a hard disk drive (not shown) or the like and has a slider 2 on which the thin film magnetic head 1 (see FIG. 2) is formed. For example, the slider 2 is mounted on the tip of an arm 8A which is rotatably supported by a pivot 8B. For example, the arm 8A is rotated by driving force of a voice coil motor (not shown), and thus the slider 2 moves in a direction X in which the slider 2 crosses a track line along a recording surface of a magnetic medium 3 such as a hard disk (a lower surface of the recording surface in FIG. 1). For example, the magnetic medium 3 rotates in a direction Z substantially perpendicular to the direction X in which the slider 2 crosses the track line.

Figure 2:
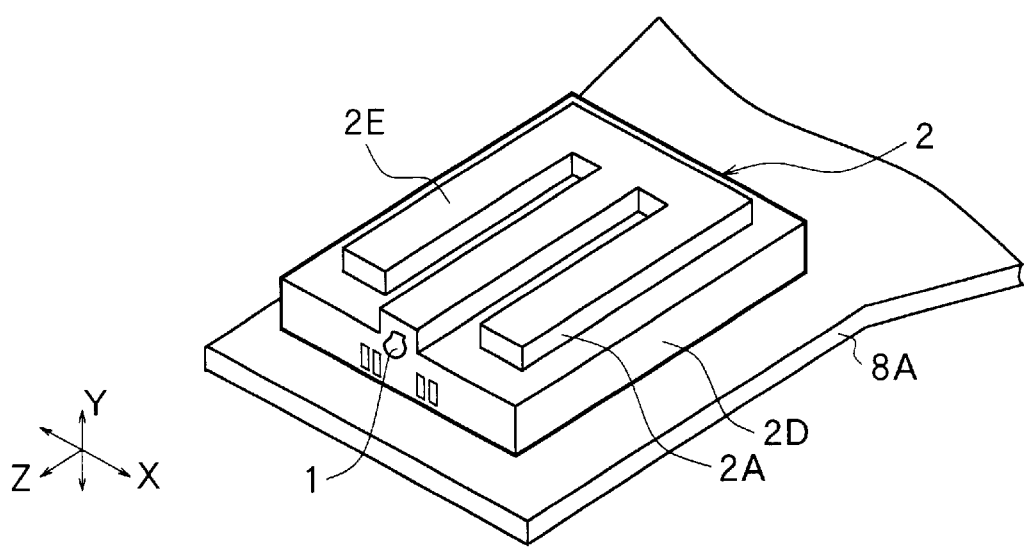
FIG. 2 is a perspective view of an appearance of a slider on which the thin film magnetic head according to the embodiment of the invention is formed.

FIG. 2 shows a configuration of the slider 2 shown in FIG. 1. The slider 2 has a block-shaped base 2D of $Al_2O_3$—TiC (alumina titanium carbide), for example. The base 2D is, for example, substantially hexahedral in shape, and one surface of the base 2D closely faces the recording surface of the magnetic medium 3 (see FIG. 1). A direction Y, where the magnetic medium 3 and the slider 2 are opposed each other, is perpendicular to the direction X and the direction Z. The surface facing the recording surface of the magnetic medium 3 is called an air bearing surface (ABS) 2E, which includes a slider rail 2A having a predetermined shape. The thin film magnetic head 1 is provided on one side of the base 2D (the left side in FIG. 2) faced with the air bearing surface 2E.

Figure 3:
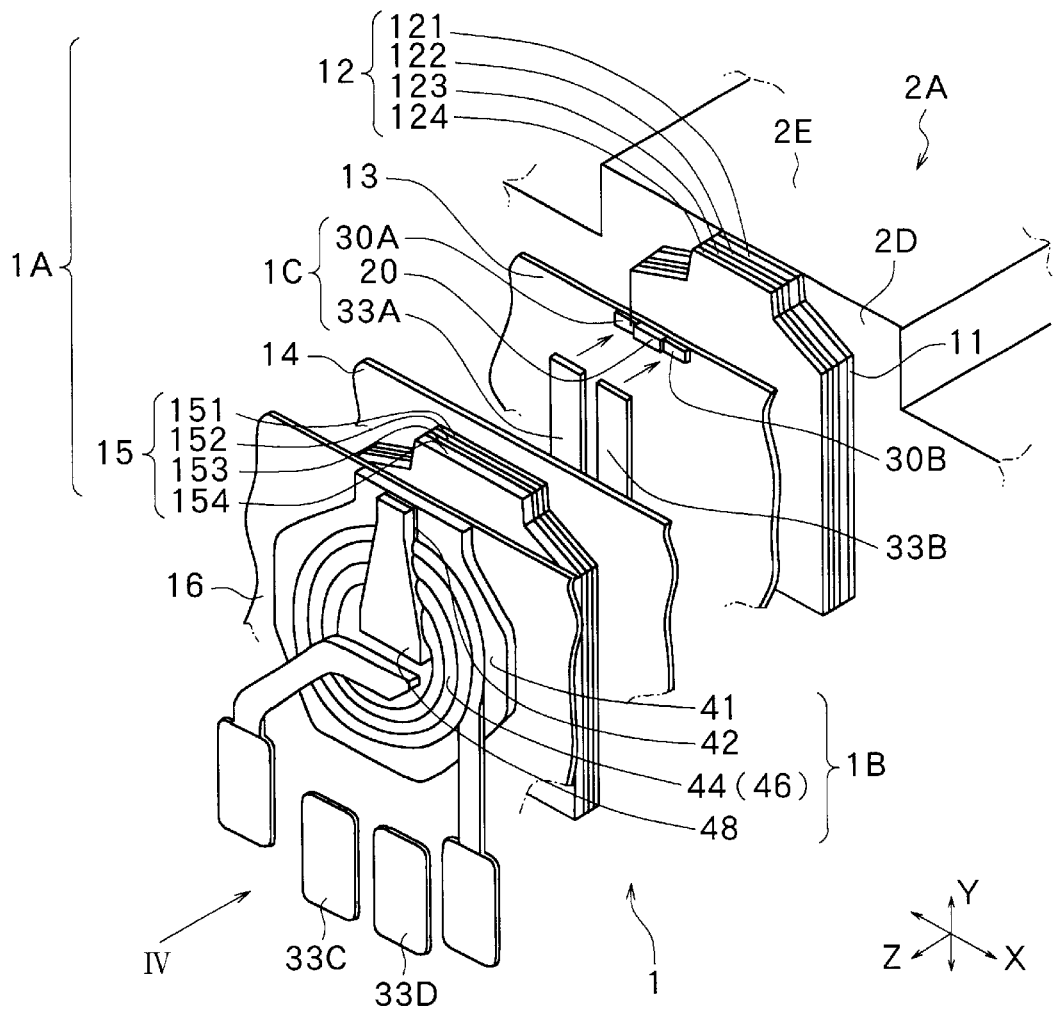
FIG. 3 is an exploded perspective view of a structure of the thin film magnetic head according to the embodiment of the invention.
Figure 4:
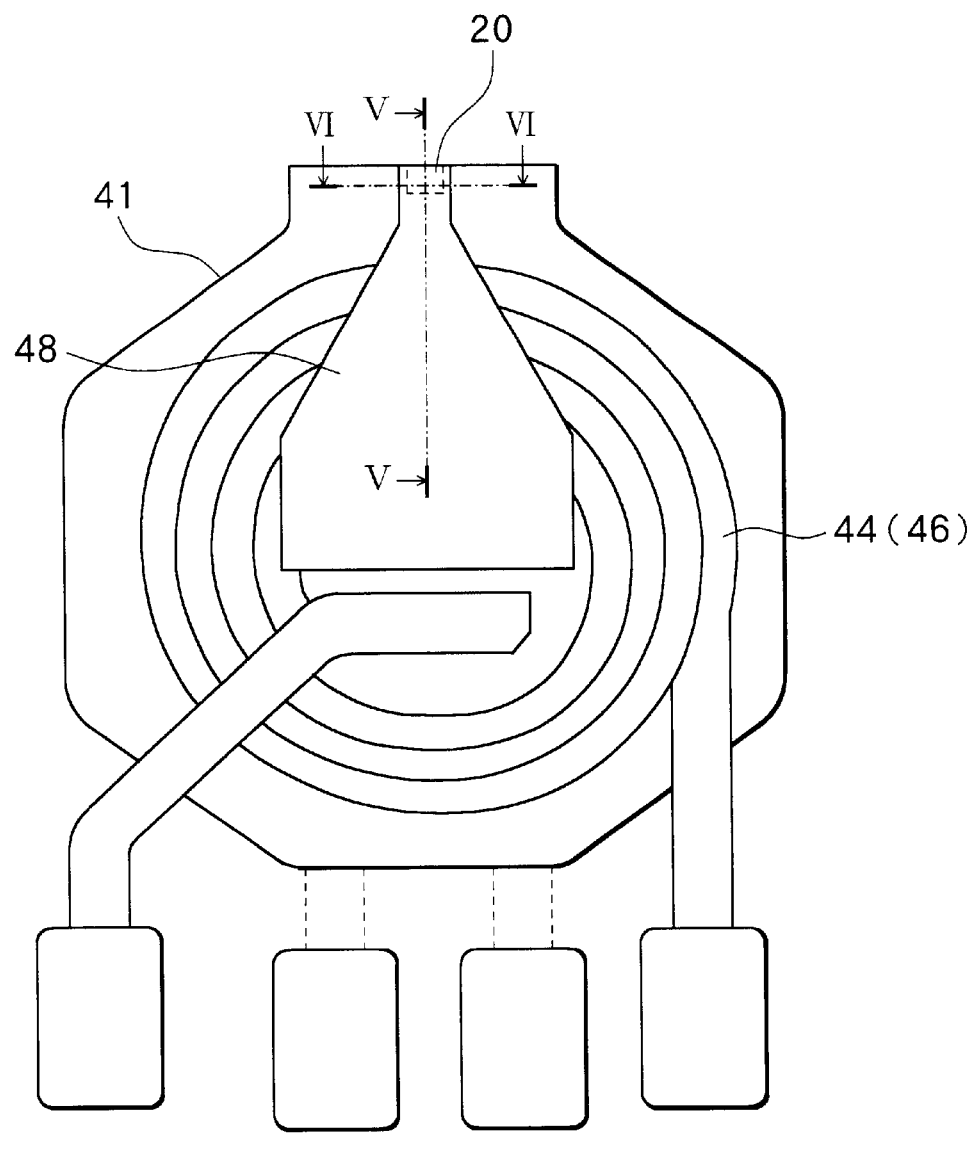
FIG. 4 is a plane view showing a planar shape of the thin film magnetic head shown in FIG. 3.
Figure 4:
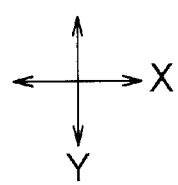
Figure 5:
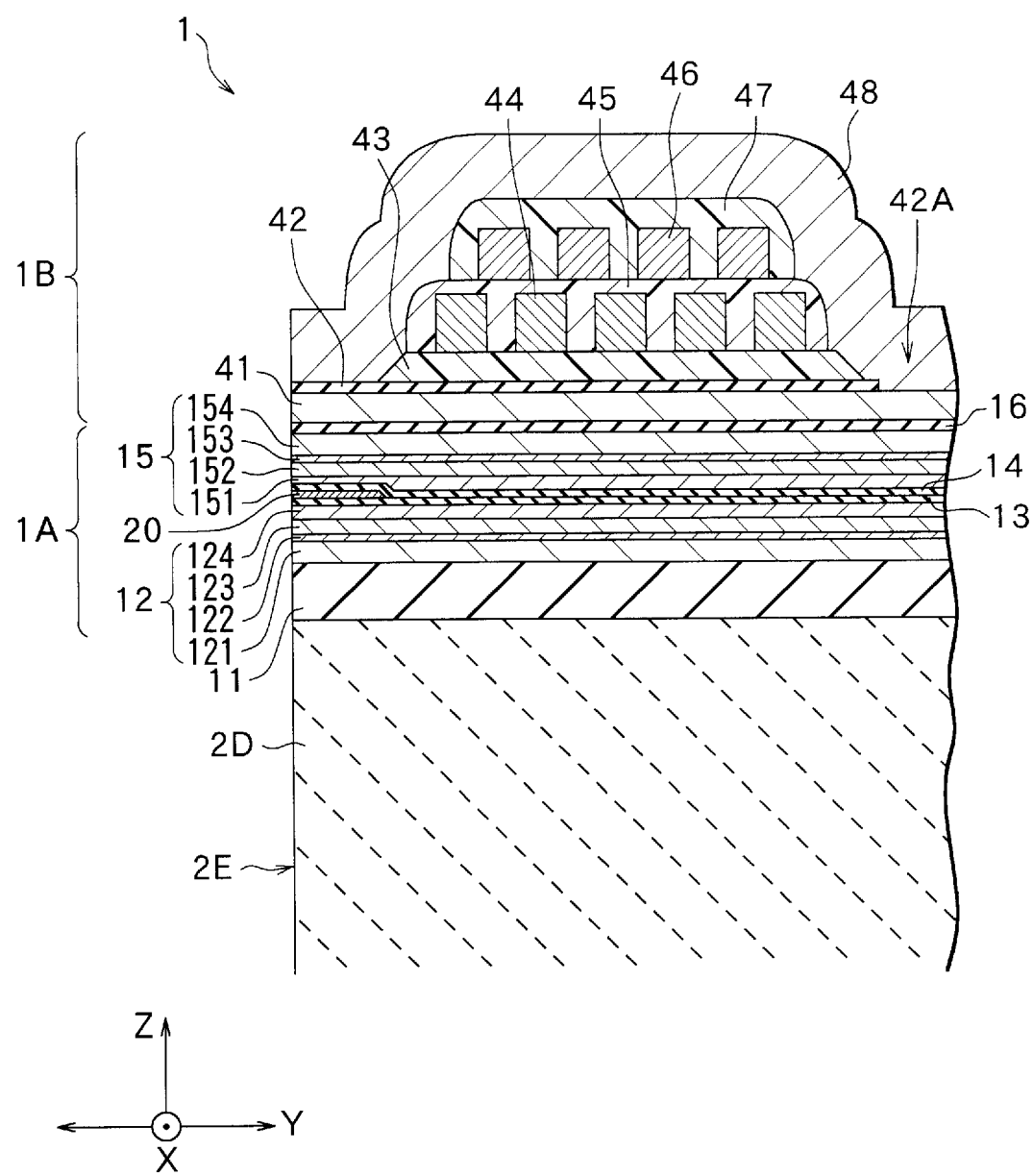
FIG. 5 is a cross sectional view showing a sectional structure of a surface perpendicular to an air bearing surface of the thin film magnetic head shown in FIG. 3.
Figure 6:
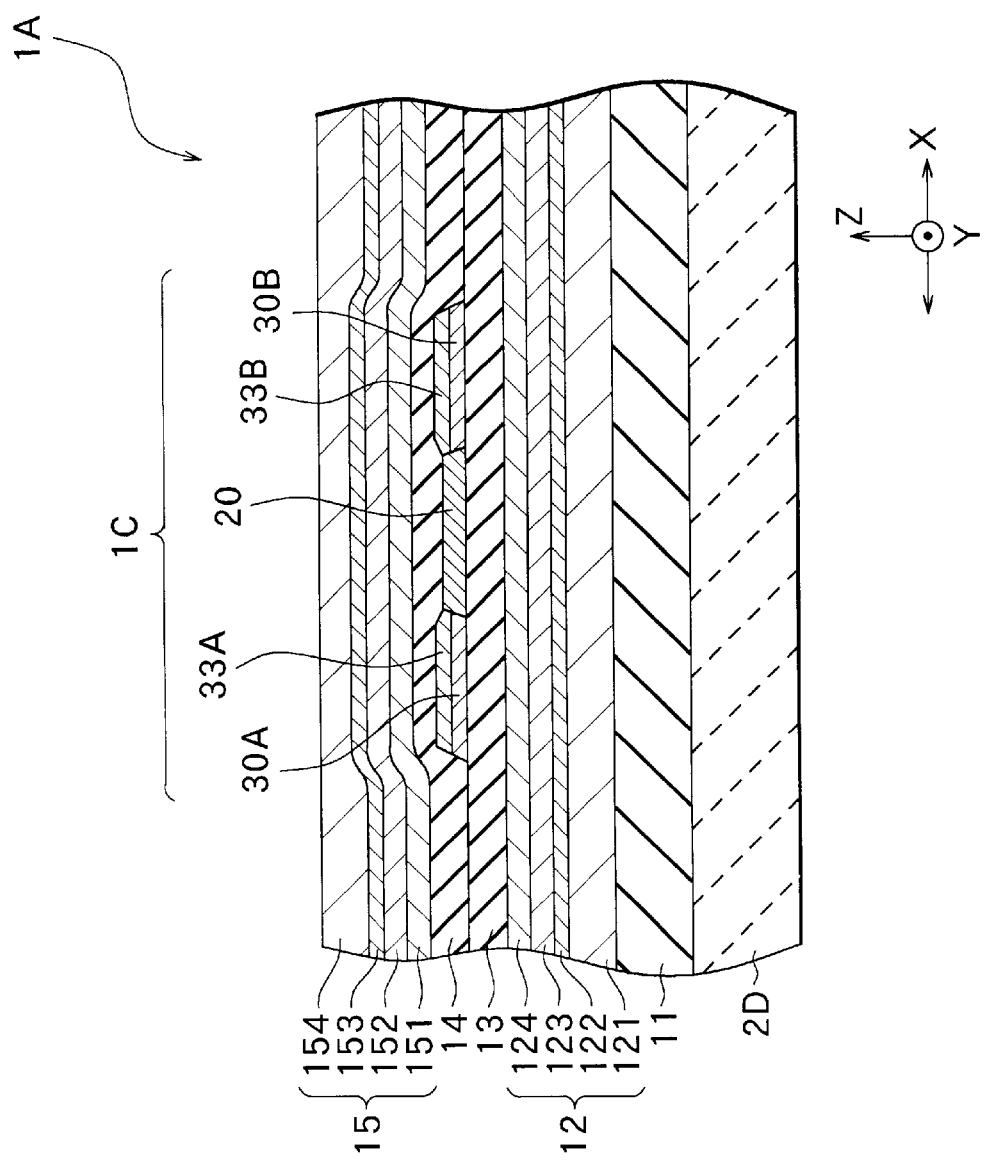
FIG. 6 is a cross sectional view showing a sectional structure of the thin film magnetic head shown in FIG. 3, showing a cross section parallel to the air bearing surface.

FIG. 3 shows an exploded view of a configuration of the thin film magnetic head 1. FIG. 4 shows a planar structure when viewed from the direction of an arrow IV in FIG. 3. FIG. 5 shows a sectional structure taken along the line V—V of FIG. 4. FIG. 6 shows a sectional structure taken along the line VI—VI of FIG. 4. The thin film magnetic head 1 has an integrated structure comprising a reproducing head 1A for reproducing magnetic information recorded on the magnetic medium 3 and a recording head 1B for recording magnetic information on the magnetic medium 3.

As shown in FIG. 3 and FIG. 5, the reproducing head 1A has a laminated structure comprising an insulating layer 11, a first shield layer 12, a first gap film 13, a second gap film 14, a second shield layer 15 and an insulating layer 16 in order on the base 2D. For example, the insulating layer 11 is 2 μm to 10 μm in thickness in a laminating direction (hereinafter simply referred to as thickness) and is made of $Al_2O_3$ (aluminum oxide).

Each of the first and second shield layers 12 and 15 is 1 μm to 3 μm in thickness, and has a four-layer structure. The first shield layer 12 and the second shield layer 15 are provided for preventing an undesired magnetic field from reaching to an MR film 20. The first shield layer 12 and the second shield layer 15 correspond to specific examples of "first magnetic layer" and "second magnetic layer" in the invention.

As shown in FIG. 6, the MR film 20 sandwiched in between the first gap film 13 and the second gap film 14 is further sandwiched in between the first shield layer 12 and the second shield layer 15. The first shield layer 12 has an outer layer 121, underlayer 122, a magnetization stabilizing layer 123 and an inner layer 124 in order from the insulating layer 11. The second shield layer 15 has an inner layer 151, a magnetization stabilizing layer 152, an isolating layer 153 and an outer layer 154 in order from the insulating layer 11. The underlayer 122 and the insolating layer 153 correspond to specific examples of "intermediate layer" in the invention.

The outer layer 121 of the first shield layer 12 is, for example, 0.5 μm to 3.0 μm in thickness, and is made of magnetic material having high magnetic permeability. The outer layer 121 is preferably made of an alloy including Ni (nickel) and Fe (iron), for example. More specifically, the outer layer 121 is preferably made of NiFe containing a Ni content of approximately 80 atom %, and an Fe content of approximately 20 atom % (hereinafter referred to as $Ni_{80}Fe_{20}$). The magnetic materials having high magnetic permeability will be described as "high-magnetic-permeability magnetic materials" hereinafter.

In the outer layer 121, the direction of magnetization can be freely changed (that is, the direction of magnetization is not controlled). It is because when the direction of magnetization can be freely changed, an undesired magnetic flux mainly flows to the outer layer 121, and hardly flows to the MR film 20, and thereby, an effect of preventing an undesired magnetic field from reaching to the MR film 20 (shield effect) can be fully exerted.

The underlayer 122 of the first shield layer 12 is 1 nm to 30 nm in thickness and is made of Ta (tantalum). The underlayer 122 is provided in order to improve the crystallinity of the magnetization stabilizing layer 123 to be formed thereon. Also, by separating the outer layer 121 and the magnetization stabilizing layer 123, the underlayer 122 has a function to prevent the direction of magnetization of the outer layer 121 from being controlled by the magnetization stabilizing layer 123.

The magnetization stabilizing layer 123 of the first shield layer 12 is, for example, 5 nm to 100 nm in thickness, and is made of antiferromagnetic material. For the antiferromagnetic material, for example, an antiferromagnetic material containing at least one element in a group consisting of Pt (platinum), Ru (ruthenium), Rh (rhodium), Pd (palladium), Ni, Au (gold), Ag (silver), Cu (Copper), Ir (iridium), Cr (chromium) and Fe, and Mn is used. Alternatively, an antiferromagnetic material containing at least one element in a group consisting of Ni, Fe and Co, and O (oxygen) may be used. The magnetization stabilizing layer 123 is provided in order to induce an exchange coupling between the magnetization stabilizing layer 123 and the inner layer 124 to be formed on the magnetic stabilizing layer 123, and thereby fixes (that is, control) the direction of magnetization of the inner layer 124 nearly in the direction X.

There are two types of antiferromagnetic material: non-heat-treatment type antiferromagnetic material which induces an exchange coupling magnetic field between the antiferromagnetic material and a ferromagnetic material without heat treatment, and heat-treatment type antiferromagnetic material which induces an exchange coupling magnetic field between the antiferromagnetic material and a ferromagnetic material with heat treatment. The magnetization stabilizing layer 123 may be made of either of them. The non-heat-treatment type antiferromagnetic materials include a Mn alloy having γ-phase, and more specifically, RuRhMn (a ruthenium-rhodium-manganese alloy), FeMn (an iron-manganese alloy), IrMn (an iridium-manganese alloy) and the like. The heat-treatment type antiferromagnetic materials include a Mn alloy having a regular crystal structure, and more specifically, PtMn (a platinum-manganese alloy), NiMn (a nickel-manganese alloy), PtRhMn (a platinum-rhodium-manganese alloy) and the like.

The inner layer 124 of the first shield layer 12 is, for example, 10 nm to 300 nm in thickness, and is made of the high-magnetic-permeability magnetic material described above. In the inner layer 124 of the first shield layer 12, the direction of magnetization is fixed nearly in the direction X by an exchange coupling between the inner layer 124 and the magnetization stabilizing layer 123, in order to stabilize output of the MR film 20.

Each of the first gap film 13 and the second gap film 14 is, for example, 10 nm to 100 nm in thickness, and is made of $Al_2O_3$ or AlN (aluminum nitride). The first gap film 13 and the second gap film 14 are provided to electrically insulate the MR film 20 to be described later, from the first shield layer 12 and the second shield layer 15, respectively. Like the first and second gap films 13 and 14, the insulating layer 16 is, for example, 10 nm to 100 nm in thickness, and is made of $Al_2O_3$ or AlN. The insulating layer 16 is provided to electrically insulate the reproducing head 1A from the recording head 1B. The MR film 20 will be described later.

The inner layer 151 of the second shield layer 15 is, for example, 10 nm to 300 nm in thickness, and is made of above-mentioned high-magnetic-permeability magnetic material. In the inner layer 151 of the second shield layer 15, the direction of magnetization is fixed nearly in the direction X by an exchange coupling between the inner layer 151 and the magnetization stabilizing layer 152, in order to stabilize output of the MR film 20.

The magnetization stabilizing layer 152 of the second shield layer 15 is, for example, 5 nm to 100 nm in thickness, and is made of antiferromagnetic material, like the magnetization stabilizing layer 123 of the first shield layer 12. Specific examples of the antiferromagnetic material are as described above. The magnetic stabilizing layer 152 is provided in order to induce an exchange coupling between the magnetization stabilizing layer 152 and the inner layer 151, and thereby fix the direction of magnetization of the inner layer 151 nearly in the direction X. When the magnetization stabilizing layer 123 of the first shield layer 12 and the magnetization stabilizing layer 152 of the second shield layer 15 are made of heat-treatment type antiferromagnetic material, it is preferable that a temperature at which an exchange coupling occurs between the magnetization stabilizing layer 123 and the inner layer 124 is as high as a temperature at which an exchange coupling occurs between the magnetization stabilizing layer 152 and the inner layer 151, because both of the exchange couplings can be carried out by one heat treatment.

The isolating layer 153 of the second shield layer 15 is 1 nm to 30 nm in thickness, and is made of, for example, Ta. The isolating layer 153 is provided in order to isolate the magnetization stabilizing layer 152 from the outer layer 154 so as not to control the direction of magnetization of the outer layer 154.

The outer layer 154 of the second shield layer 15 is 0.5 $\mu$m to 3.0 $\mu$m in thickness, and is made of the above-mentioned high-magnetic-permeability magnetic material. The direction of magnetization of the outer layer 154 can be freely changed. More specifically, it is preferable that the direction of magnetization throughout the outer layer 154 can be freely changed, because the more freely the direction of magnetization can be changed, the more sufficiently the shield effect preventing an undesired magnetic field from reaching to the MR film 20 can be exerted.

An MR element 1C including the MR film 20, which is a spin valve film, is sandwiched in between the first gap film 13 and the second gap film 14. The reproducing head 1A is adapted to read out information recorded on the magnetic medium 3 through the use of the electrical resistance of the MR film 20 changing according to a signal magnetic field of the magnetic medium 3. The MR film 20 corresponds to a specific example of "functional film" in the invention.

Figure 7:
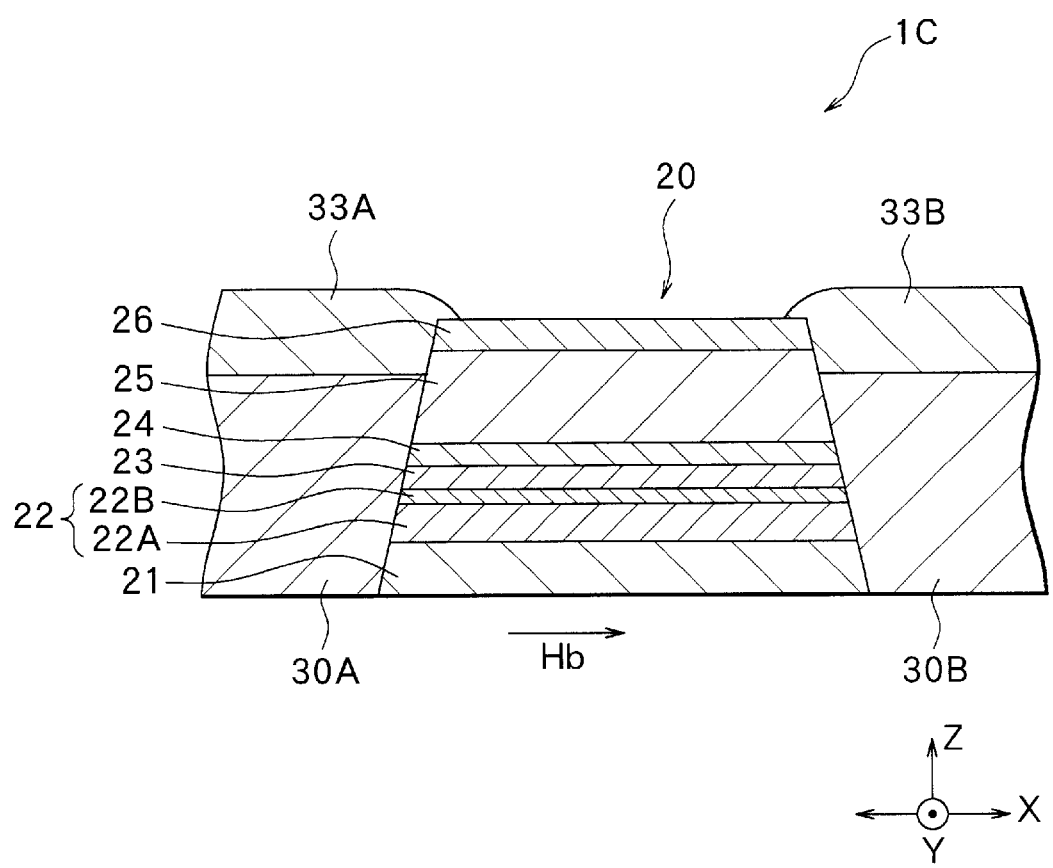
FIG. 7 is an enlarged sectional view of a structure of an MR element of the thin film magnetic head shown in FIG. 3.

FIG. 7 shows a cross sectional view of a sectional structure of the MR element 1C. The MR film 20 of the MR element 1C has a laminated structure with an underlayer 21, a first soft magnetic layer 22A, a second soft magnetic layer 22B, a nonmagnetic layer 23, a ferromagnetic layer 24, an antiferromagnetic layer 25 and a cap layer 26 in order on the first gap film 13. For example, the underlayer 21 is 5 nm to 10 nm in thickness, and is made of Ta.

The first soft magnetic layer 22A is, for example, 1 nm to 3 nm in thickness, and is made of magnetic material containing at least Ni in a group consisting of Ni, Co (cobalt) and Fe. For example, the second soft magnetic layer 22B is 0.5 nm to 3 nm in thickness, and is made of magnetic material containing at least Co in a group consisting of Ni, Co and Fe. The first soft magnetic layer 22A and the second soft magnetic layer 22B constitute a soft magnetic layer 22 which is sometimes called a free layer, and the soft magnetic layer 22 is adapted to change the direction of magnetization thereof according to a signal magnetic field from the magnetic medium 3.

The nonmagnetic layer 23 is, for example, 1.8 nm to 3.0 nm in thickness, and is made of nonmagnetic material containing at least one element in a group consisting of Au, Ag, Cu, Ru, Rh, Re (rhenium), Pt and W (tungsten). The nonmagnetic layer 23 is provided to magnetically isolate the soft magnetic layer 22 from the ferromagnetic layer 24 and the antiferromagnetic layer 25 as much as possible.

The ferromagnetic layer 24 is, for example, 2 nm to 4.5 nm in thickness, and is made of magnetic material containing at least Co in a group consisting of Co and Fe. In the ferromagnetic layer 24, a plane (111) of the magnetic material is preferably oriented in the laminating direction. The ferromagnetic layer 24 is also called a pinned layer, and the direction of magnetization of the ferromagnetic layer 24 is fixed by an exchange coupling on an interface between the ferromagnetic layer 24 and the antiferromagnetic layer 25. In the embodiment, the direction of magnetization of the ferromagnetic layer 24 is fixed in the direction Y.

The antiferromagnetic layer 25 is, for example, 5 nm to 30 nm in thickness, and is made of antiferromagnetic material containing at least one element in a group consisting of Pt, Ru, Rh, Pd, Ni, Au, Ag, Cu, Ir, Cr and Fe, and Mn, or antiferromagnetic material containing at least one element in a group consisting of Ni, Fe and Co, and O. The antiferromagnetic layer 25 may be made of either of the non-heat-treatment type antiferromagnetic material which induces an exchange coupling magnetic field between the antiferromagnetic material and a ferromagnetic material without heat treatment, and the heat-treatment type antiferromagnetic material which induces an exchange coupling magnetic field between the antiferromagnetic material and a ferromagnetic material with heat treatment. As described above, the non-heat-treatment type antiferromagnetic materials include RuRhMn, FeMn, IrMn and so forth, and the heat-treatment type antiferromagnetic materials include PtMn, NiMn, PtRhMn and so forth.

When the antiferromagnetic layer 25 is made of heat-treatment type antiferromagnetic material, a temperature at which an exchange coupling between the antiferromagnetic layer 25 and the ferromagnetic layer 24 occurs is preferably different from a temperature at which an exchange coupling between the magnetization stabilizing layer 123 and the inner layer 124 in the first shield layer 12 (and an exchange coupling between the magnetization stabilizing layer 152 and the inner layer 151 in the second shield layer 15), so that the heat treatment for each exchange coupling can be independently carried out.

The cap layer 26 is, for example, 5 nm to 10 nm in thickness, and is made of Ta or the like. The cap layer 26 is provided to protect the MR film 20 during the manufacturing process of the thin film magnetic head 1.

Magnetic domain control films 30A and 30B are provided on both sides of the MR film 20 in a direction perpendicular to the laminating direction, respectively. The magnetic domain control films 30A and 30B are made of, for example, hard magnetic material such as CoPt (cobalt platinum) so as to generate a bias magnetic field Hb to the MR film 20 in the direction X. The magnetic domain control films 30A and 30B generate the bias magnetic field Hb and thus orient the magnetization of the soft magnetic layer 22 of the MR film 20 in the direction of the bias magnetic field Hb, so as to prevent the so-called Barkhausen noise.

Instead of making the magnetic domain control films 30A and 30B of hard magnetic material, each of the magnetic domain control films 30A and 30B may have a laminated structure with an antiferromagnetic film and a ferromagnetic film. As the antiferromagnetic film, the above-mentioned heat-treatment type antiferromagnetic material and non-heat-treatment type antiferromagnetic material can be used. When the antiferromagnetic film is made of the heat-treatment type antiferromagnetic material, a heat treatment is required to induce an exchange coupling between the antiferromagnetic film and the ferromagnetic film. On the other hand, when the antiferromagnetic film is made of the non-heat-treatment type antiferromagnetic material, no heat treatment is required.

On the magnetic domain control films 30A and 30B, lead layers 33A and 33B made of, for example, Ta are provided, respectively. The lead layers 33A and 33B are connected to terminals 33C and 33D, respectively through openings (not shown) formed in the second gap film 14 and insulating layer 16. Thereby, electric current can be fed to the MR film 20 through the lead layers 33A and 33B in the direction X.

For example, as shown in FIG. 3 and FIG. 5, the recording head 1B has a bottom pole 41 of 0.5 $\mu$m to 3 $\mu$m thick made of magnetic material such as NiFe, which is formed on the insulating layer 16 of the reproducing head 1A. A write gap film 42 of 0.05 $\mu$m to 0.3 $\mu$m thick made of $Al_2O_3$ or the like is formed on the bottom pole 41. The write gap film 42 has an opening 42A at a position corresponding to the center of thin film coils 44 and 46 to be described later. An insulating layer 43, which is made of $Al_2O_3$ or the like and has a thickness of 1.0 $\mu$m to 5.0 $\mu$m for determining a throat height, is formed on the write gap film 42. The thin film coil 44 of 1 $\mu$m to 3 $\mu$m thick and a photoresist layer 45 for coating the thin film coil 44 are formed on the insulating layer 43. The thin film coil 46 of 1 $\mu$m to 3 $\mu$m thick and a photoresist layer 47 for coating the thin film coil 46 are formed on the photoresist layer 45. In the embodiment, the description is given with regard to an example in which the thin film coil have a two-layer structure, but the number of layers in the thin film coil may be one, or three or more.

A top pole 48 of about 3 $\mu$m thick made of magnetic material having a high saturation magnetic flux density, such as NiFe or FeN (iron nitride), is formed on the write gap film 42, the insulating layer 43 and the photoresist layers 45 and 47. The top pole 48 is in contact with and magnetically coupled to the bottom pole 41 through the opening 42A of the write gap film 42 formed at the position corresponding to the center of the thin film coils 44 and 46. An overcoat layer (an overcoat layer 49 shown in FIG. 15) of 20 $\mu$m to 30 $\mu$m thick made of, for example, $Al_2O_3$ is formed on the top pole 48 so as to coat the overall surface. In the embodiment, a layer structure including the bottom pole 41 through the overcoat layer corresponds to the recording head 1B. The recording head 1B generates a magnetic flux between the bottom pole 41 and the top pole 48 by a current passing through the thin film coils 44 and 46, and thus magnetizes the magnetic medium 3 by the magnetic flux generated near the write gap film 42, so as to record information.

<Operation of MR Element and Thin Film Magnetic Head>

Next, a reproducing operation of the thin film magnetic head 1 configured as described above will be described mainly by referring to FIGS. 6 and 7.

In the thin film magnetic head 1, the reproducing head 1A reads out information recorded on the magnetic medium 3. In the reproducing head 1A, the direction of magnetization of the ferromagnetic layer 24 is fixed in the direction Y by the exchange coupling on the interface between the ferromagnetic layer 24 and the antiferromagnetic layer 25 in the MR film 20. The magnetization of the first and second soft magnetic layers 22A and 22B is oriented in the same direction as the direction of the bias magnetic field Hb (in the direction X in the embodiment) by the bias magnetic field Hb generated by the magnetic domain control films 30A and 30B. The direction of magnetization of the bias magnetic field Hb is substantially perpendicular to the direction of magnetization of the ferromagnetic layer 24. In order to read out information, a sense current that is a stationary electric current is fed through the MR film 20 via the lead layers 33A and 33B in the direction X.

In the MR film 20, the direction of magnetization of the soft magnetic layer 22 is changed according to a signal magnetic field of the magnetic medium 3. On the other hand, the direction of magnetization of the ferromagnetic layer 24 is not changed because the direction is fixed by the exchange coupling between the ferromagnetic layer 24 and the antiferromagnetic layer 25. When the direction of magnetization of the soft magnetic layer 22 changes, a current passing through the MR film 20 is subjected to resistance according to a relative angle between the direction of magnetization of the soft magnetic layer 22 and the direction of magnetization of the ferromagnetic layer 24. This results from a phenomenon called "spin-dependent scattering". The amount of change in resistance of the MR film 20 is detected as the amount of change in voltage, and thus, information recorded on the magnetic medium 3 is read out.

Next, operations of the first shield layer 12 and the second shield layer 15 will be described. Many data elements (each of which is an area corresponding to 1 bit of data, not shown) are arranged at regular spaces in the direction Z on the track line of the magnetic medium 3. When the MR film 20 faces one data element on the magnetic medium 3, magnetic fluxes from other data elements adjacent to the data element flow through the first and second shield layers 12 and 15, so the magnetic fluxes hardly flow through the MR film 20. That is, the first shield layer 12 and the second shield layer 15 make full use of the shield effects for preventing the influence of an undesired external magnetic field from reaching to the MR film 20.

In the outer layer 121 of the first shield layer 12 and the outer layer 154 of the second shield layer 15, the directions of magnetization can be freely changed, so magnetic fluxes from data elements other than the data element to be read out flows through the outer layers 121 and 154. Thereby, the shield effect for preventing an undesired external magnetic field from reaching to the MR film 20 can be fully exerted.

Further, the direction of magnetization of the inner layer 124 of the first shield layer 12 is almost fixed by the magnetization stabilizing layer 123, and the direction of magnetization of the inner layer 151 of the second shield layer 15 is almost fixed by the magnetization stabilizing layer 152. Thus, the directions of magnetization of the first and second shield layers 12 and 15 near the MR film 20 are almost fixed, so that changes in resistance of the MR film 20 resulting from changes in the directions of magnetization of the first and second shield layers 12 and 15 can be prevented. That is, output of the thin film magnetic head 1 can be stabilized.

In order to stabilize the output of the thin film magnetic head 1 and make full use of the shield effect, the followings are required, that is, (1) the directions of magnetization of the inner layers 124 and 151 are controlled, and (2) the directions of magnetization of the outer layers 121 and 154 can be freely changed. In other words, uniaxially anisotropic magnetic fields of the outer layers 121 and 154 are closer to 0 than those of the inner layers 124 and 151. Ideally, it is preferable that the uniaxially anisotropic magnetic fields of the inner layers 124 and 151 are values other than 0, and the uniaxially anisotropic magnetic fields of the outer layers 121 and 154 are 0. In the embodiment, the value of uniaxially anisotropic magnetic field is an average of target layers.

<Method of Manufacturing Thin Film Magnetic Head>

Next, a method of manufacturing the MR element 1C and the thin film magnetic head 1 will be described with reference to FIGS. 8 through 15. FIGS. 8 through 15 show sectional structures taken along the line V—V of FIG. 4.

Figure 8:
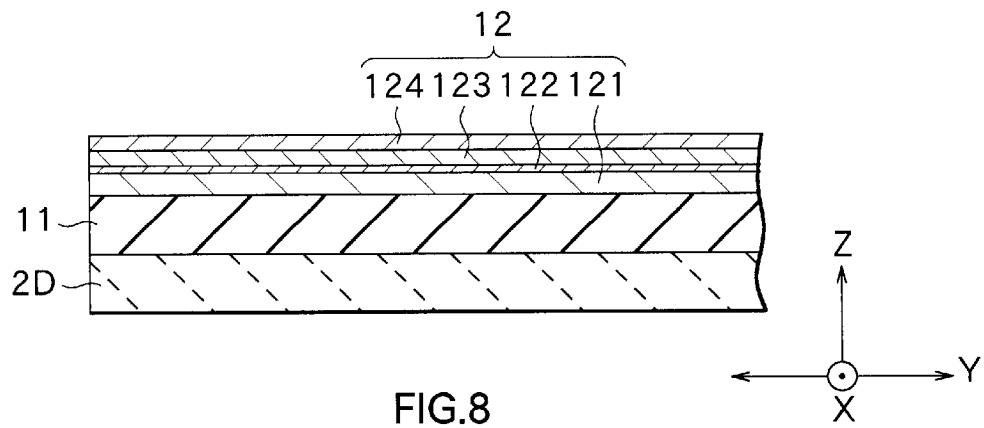
FIG. 8 is a cross sectional view for describing a step of a method of manufacturing the thin film magnetic head shown in FIG. 3.

In the manufacturing method according to the embodiment, first of all, as shown in FIG. 8, for example, the insulating layer 11 is formed on one surface of the base 2D made of $Al_2O_3$—TiC by means of sputtering using the material mentioned in the description of the configuration. Then, the outer layer 121 of the first shield layer 12 is formed on the insulating layer 11 by means of, for example, plating using the material mentioned in the description of the configuration. Then, the underlayer 122, the magnetization stabilizing layer 123 and the inner layer 124 are formed in order on the outer layer 121 by means of, for example, sputtering using the materials mentioned in the description of the configuration, and thus the first shield layer 12 is formed. After that, the first shield layer 12 is patterned into a shape shown in FIG. 3 by means of ion milling.

Figure 9:
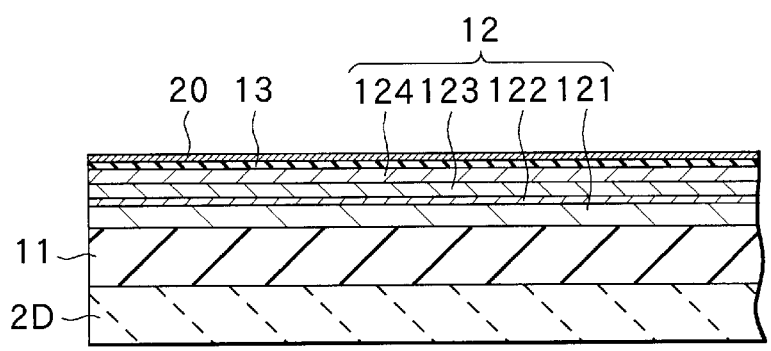
FIG. 9 is a cross sectional view for describing a step following the step shown in FIG. 8.
Figure 10:
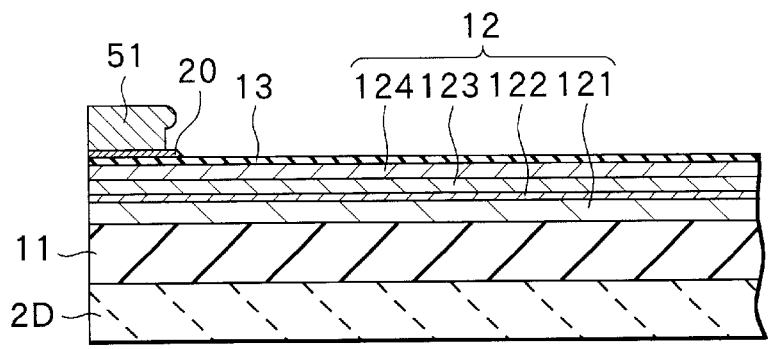
FIG. 10 is a cross sectional view for describing a step following the step shown in FIG. 9.

Then, the underlayer 21, the first soft magnetic layer 22A, the second soft magnetic layer 22B, the nonmagnetic layer 23, the ferromagnetic layer 24, the antiferromagnetic layer 25 and the cap layer 26 shown in FIG. 7 are formed in order on the first shield layer 12 by means of, for example, sputtering using the materials mentioned in the description of the configuration, and thus the MR film 20 shown in FIG. 9 is formed. After that, as shown in FIG. 10, a photoresist film 51 for patterning is selectively formed on the MR film 20. After forming the photoresist film 51, the MR film 20 is etched by means of, for example, ion milling using the photoresist film 51 as a mask, and thus the MR film 20 having a shape shown in FIG. 7 is formed.

After patterning the MR film 20, the magnetic domain control films 30A and 30B shown in FIG. 7 are formed on both sides of the MR film 20 by means of, for example, sputtering using the hard magnetic material mentioned in the description of the configuration. After that, the lead layers 33A and 33B shown in FIG. 7 are formed on the magnetic domain control films 30A and 30B, respectively, by means of sputtering using the material mentioned in the description of the configuration. After that, the photoresist film 51 and a deposit laminated on the photoresist film 51 are removed by means of lift-off procedures, for example.

Figure 11:
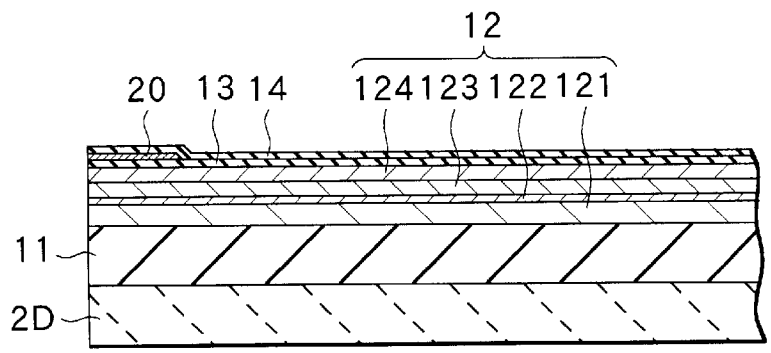
FIG. 11 is a cross sectional view for describing a step following the step shown in FIG. 10.

After lift-off procedures, as shown in FIG. 11, the second gap film 14 is formed by means of, for example, sputtering using the material mentioned in the description of the configuration, so as to coat the first gap film 13 and the MR film 20. Thus, the MR film 20 is sandwiched in between the first gap film 13 and the second gap film 14.

Figure 12:
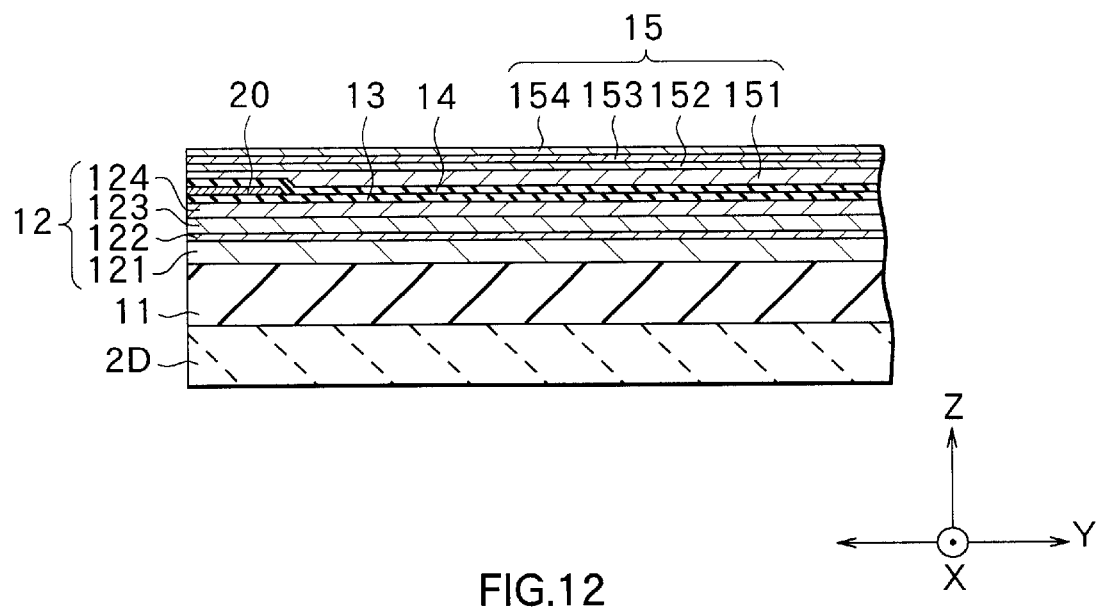
FIG. 12 is a cross sectional view for describing a step following the step shown in FIG. 11.
Figure 13:
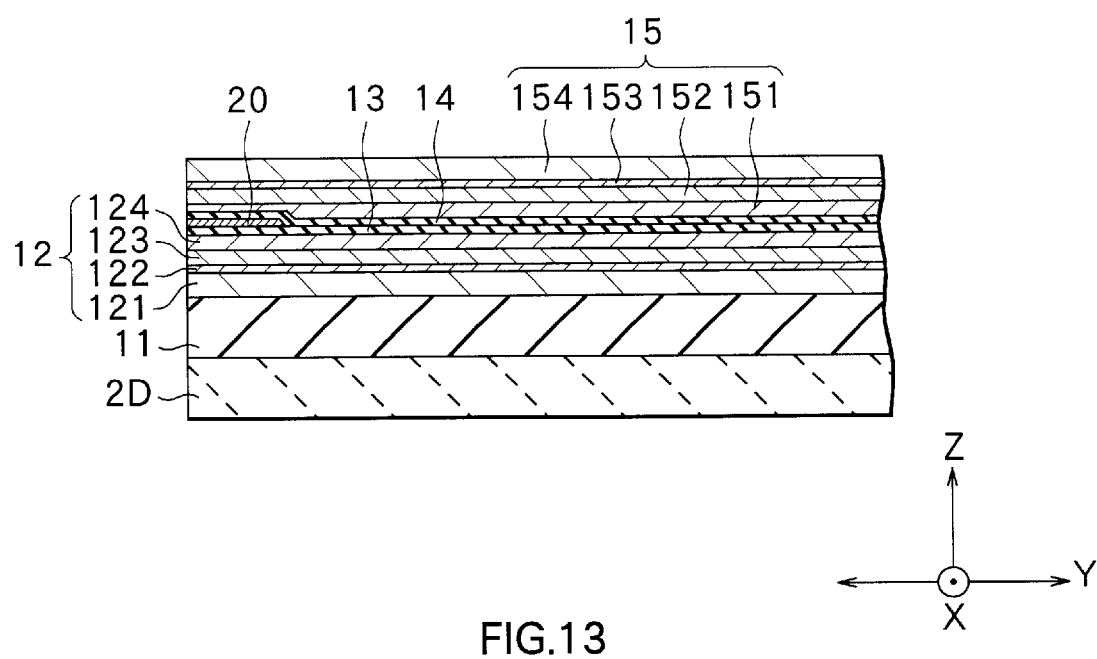
FIG. 13 is a cross sectional view for describing a step following the step shown in FIG. 12.

After that, as shown in FIG. 12, the inner layer 151, the magnetization stabilizing layer 152, the isolating layer 153, and a part of the outer layer 154 of the second shield layer 15 are formed in order on the second gap film 14 by means of, for example, sputtering using the materials mentioned in the description of the configuration. In this case, the outer layer 154, of which the final thickness is 2 $\mu$m, is formed with a thickness of, for example, only 30 nm by means of sputtering. Then, as shown in FIG. 13, the remaining part (of about 2 $\mu$m thick) of the outer layer 154 is formed by means of plating using the part of the outer layer 154 having formed by means of sputtering as an electrode, and thus the second shield layer 15 is formed. After that, the second shield layer 15 is patterned into a shape shown in FIG. 3 by means of ion milling.

Figure 14:
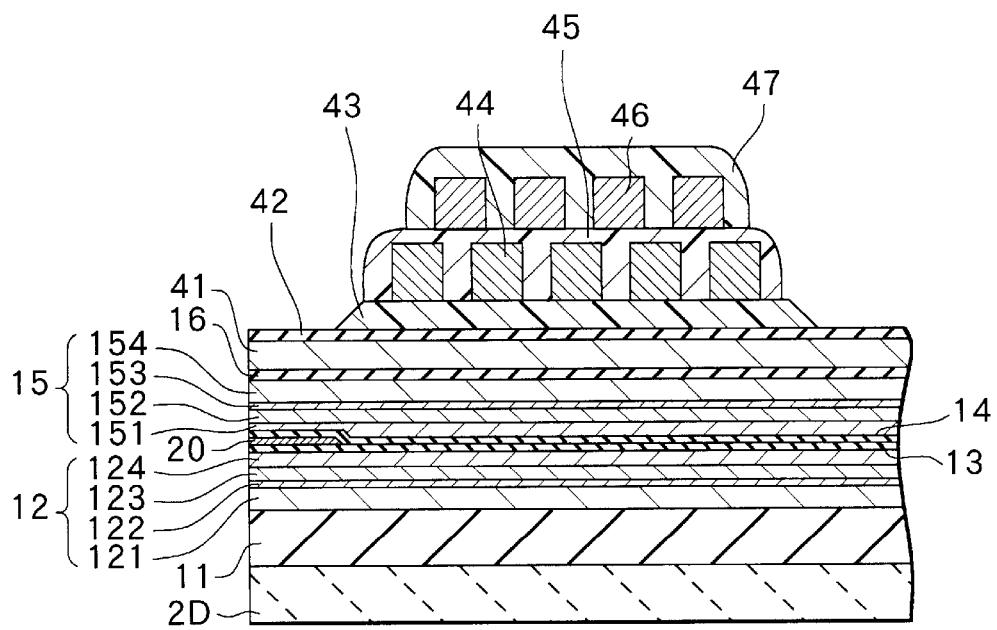
FIG. 14 is a cross sectional view for describing a step following the step shown in FIG. 13

After patterning the second shield layer 15, as shown in FIG. 14, the insulating layer 16 is formed by means of, for example, sputtering using the material mentioned in the description of the configuration. After forming the insulating layer 16, the bottom pole 41 is formed on the insulating layer 16 by means of, for example, sputtering using the material mentioned in the description of the configuration. Then, the write gap film 42 is formed on the bottom pole 41 by means of, for example, sputtering, and then the insulating layer 43 is formed into a predetermined pattern on the write gap film 42. After forming the insulating layer 43, the thin film coil 44 is formed on the insulating layer 43 by using the material mentioned in the description of the configuration, and then the photoresist layer 45 is formed into a predetermined pattern so as to coat the thin film coil 44. After forming the photoresist layer 45, the thin film coil 46 is formed on the photoresist layer 45 by using the material mentioned in the description of the configuration, and then the photoresist layer 47 is formed into a predetermined pattern so as to coat the thin film coil 46.

Figure 15:
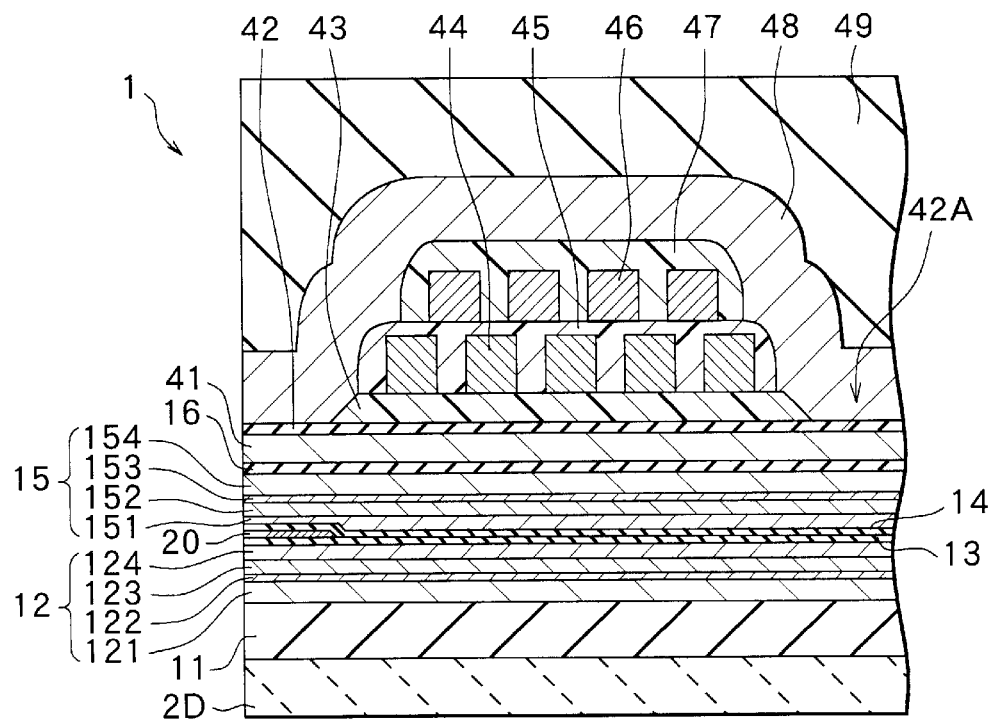
FIG. 15 is a cross sectional view for describing a step following the step shown in FIG. 14.

After forming the photoresist layer 47, as shown in FIG. 15, for example, the write gap film 42 is partly etched at the position corresponding to the center of the thin film coils 44 and 46, and thus the opening 42A for forming a magnetic path is formed. After that, for example, the top pole 48 is formed on the write gap film 42, the opening 42A, the insulating layer 43 and the photoresist layers 45 and 47 by using the material mentioned in the description of the configuration. After forming the top pole 48, for example, the write gap film 42 and the bottom pole 41 are selectively etched by means of ion milling using the top pole 48 as a mask. After that, the overcoat layer 49 is formed on the top pole 48 by using the material mentioned in the description of the configuration.

Next, heat treatments are carried out to induce exchange couplings. In the method, a first heat treatment is carried out to induce an exchange coupling between the ferromagnetic layer 24 and the antiferromagnetic layer 25 of the MR film 20, and a second heat treatment is carried out to induce an exchange coupling between the inner layer 124 and the magnetization stabilizing layer 123 of the first shield layer 12 and an exchange coupling between the inner layer 151 and the magnetization stabilizing layer 152 of the second field layer 15.

In the method, a first heat treatment temperature for inducing the exchange coupling between the ferromagnetic layer 24 and the antiferromagnetic layer 25 of the MR film 20 is set at 250° C., for example. A temperature for inducing the exchange coupling between the inner layer 124 and the magnetization stabilizing layer 123 of the first shield layer 12 (that is, a second heat treatment temperature) is equal to a temperature for inducing the exchange coupling between the inter layer 151 and the magnetization stabilizing layer 152 of the second shield layer 15, and is set at 200° C., for example.

In this case, at first, in order to induce the exchange coupling between the antiferromagnetic layer 25 and the ferromagnetic layer 24 of the MR film 20, a heat treatment is performed at the first temperature while applying a magnetic field in, for example, the direction Y by use of a magnetic field generating apparatus or the like. Thus, the direction of magnetization of the ferromagnetic layer 24 of the MR film 20 is fixed in the direction Y of the applied magnetic field by the exchange coupling between the ferromagnetic layer 24 and the antiferromagnetic layer 25. After that, the temperature is lowered to the second heat treatment temperature, and the direction of the magnetic field applied by the magnetic field generating apparatus is changed in the direction X. Thereby, the second heat treatment for inducing the exchange coupling between the inner layer 124 and the magnetization stabilizing layer 123 of the first shield layer 12, and the exchange coupling between the inner layer 151 and the magnetization stabilizing layer 152 of the second shield layer 15 is carried out.

When the first heat treatment temperature is lower than the second heat treatment temperature, firstly, the second heat treatment is carried out, and then the temperature is lowered, and the direction of the applied magnetic field is changed, and thus the first heat treatment is carried out.

Finally, for example, the air bearing surface 2E of the slider 2 is polished and thus the thin film magnetic head 1 is completed.

<Advantages of Embodiment>

As described above, according to the embodiment, the directions of magnetization of the inner layer 124 of the first shield layer 12 and the inner layer 151 of the second shield layer 15 both located near MR film 20 are controlled by the magnetization stabilizing layers 123 and 152, respectively, so changes in resistance of the MR film 20 resulting from changes in the directions of magnetization of the first shield layer 12 and the second shield layer 15 can be prevented. That is, output of the thin film magnetic head 1 can be stabilized.

Further, the directions of magnetization of the outer layer 121 of the first shield layer 12 and the outer layer 154 of the second shield layer 15 are not controlled, so they can be freely changed. Therefore, the shield effect for preventing the influence of an external magnetic field from reaching to the MR film 20 can be fully exerted. That is, while original functions of the first shield layer 12 and the second shield layer 15 can be fully exerted, output of the thin film magnetic head 1 can be stabilized.

In addition, as the directions of magnetization of the inner layer 124 of the first shield layer 12 and the inner layer 151 of the second shield layer 15 are controlled by use of the exchange coupling between the inner layer 124 and the magnetization stabilizing layer 123 having antiferromagnetism and the exchange coupling between the inner layer 151 and the magnetization stabilizing layer 152 having antiferromagnetism, the directions of magnetization can be controlled by relatively simple means.

Further, in the first shield layer 12, three layers of the under layer 122, the magnetization stabilizing layer 123 and the inner layer 124, and the outer layer 121 are discontinuously formed by different forming means, so that during the heat treatment for controlling the direction of magnetization of the inner layer 124, the direction of magnetization of the outer layer 121 can be prevented from being controlled.

Moreover, as the underlayer 122 is sandwiched in between the outer layer 121 and the magnetization stabilizing layer 123 of the first shield layer 12, and the isolating layer 153 is sandwiched in between the outer layer 154 and the magnetization stabilizing layer 152 of the second shield layer 15, the directions of magnetization of the outer layers 121 and 154 can be prevented from being controlled.

Further, as the first heat treatment temperature for inducing the exchange coupling between the ferromagnetic layer 24 and the antiferromagnetic layer 25 of the MR film 20 is different from the second heat treatment temperature for inducing the exchange coupling between the inner layer 124 and the magnetization stabilizing layer 123 of the first shielding layer 12 (and the exchange coupling between the inner layer 151 and the magnetization stabilizing layer 152 of the second shield layer 15), the heat treatment for controlling the direction of magnetization of the ferromagnetic layer 24, and the heat treatment for controlling the directions of magnetization of the inner layers 124 and 151 can be independently carried out.

In addition, the directions of magnetization of the inner layers 124 and 151 is nearly parallel to the bias magnetic field Hb applied to the MR film 20 by the magnetic domain control films 30A and 30B (the nearby parallel direction means both the same direction and the opposite direction), so that the influence which the magnetic fields in the outer layers 121 and 154 have on the MR film 20 can be reduced.

<First Modification>

Next, a first modification of the embodiment will be described. A thin film magnetic head 101 according to the modification has the same configuration of the thin film magnetic head 1 described in the above embodiment, except for the configuration of the second shield layer. In the drawing of the modification, the same components as the components of the first embodiment shown in FIGS. 1 through 15 are denoted by the same numerals as the numerals thereon, and will not be further explained.

Figure 16:
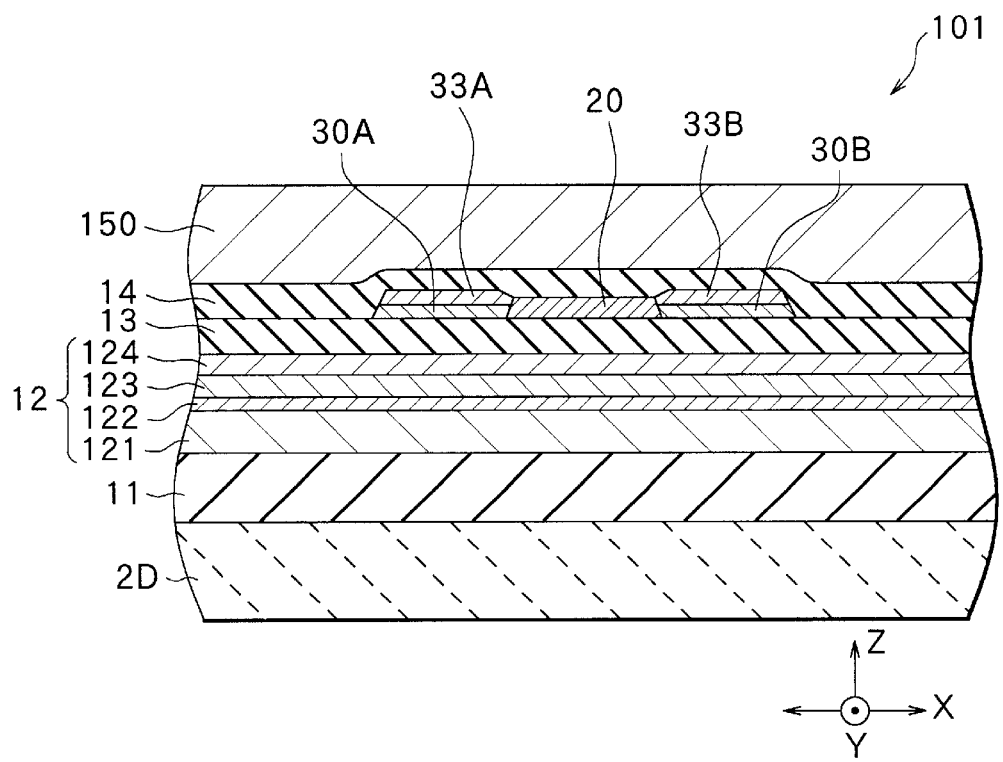
FIG. 16 is a cross sectional view showing a sectional structure of a thin film magnetic head according to a first modification of a first embodiment.

FIG. 16 shows a reproducing head of the thin film magnetic head 101 according to the modification viewed from a magnetic medium, and corresponds to the sectional surface taken along the line VI—VI of FIG. 4. In the modification, a second shield layer 150 has a single-layer structure, and is made of the above-mentioned high-magnetic-permeability magnetic material. The second shield layer 150 is, for example, 1 μm to 3 μm in thickness. That is, the direction of magnetization throughout the second shield layer 150 can be freely changed.

In the modification, the direction of magnetization of a region of the first shield layer 12 near the MR film 20 is controlled, but the direction of magnetization of the second shield layer 150 is not at all controlled. Therefore, an effect for preventing a change in output of the MR element 1C slightly declines, compared with the above first embodiment. However, as the direction of magnetization throughout the second shield layer 150 can be freely changed, an undesired magnetic flux easily flows to the second shield layer 150, and thereby, the shield effect for preventing an undesired magnetic field from reaching to the MR film 20 is improved.

<Second Modification>

Next, a second modification of the embodiment will be described. A thin film magnetic head 102 according to the modification has the same configuration of the thin film magnetic head 1 shown in the above embodiment, except for the configuration of the first shield layer. In the drawing of the modification, the same components as the components of the first embodiment shown in FIGS. 1 though 15 are denoted by the same numerals as the numerals thereon, and will not be further explained.

Figure 17:
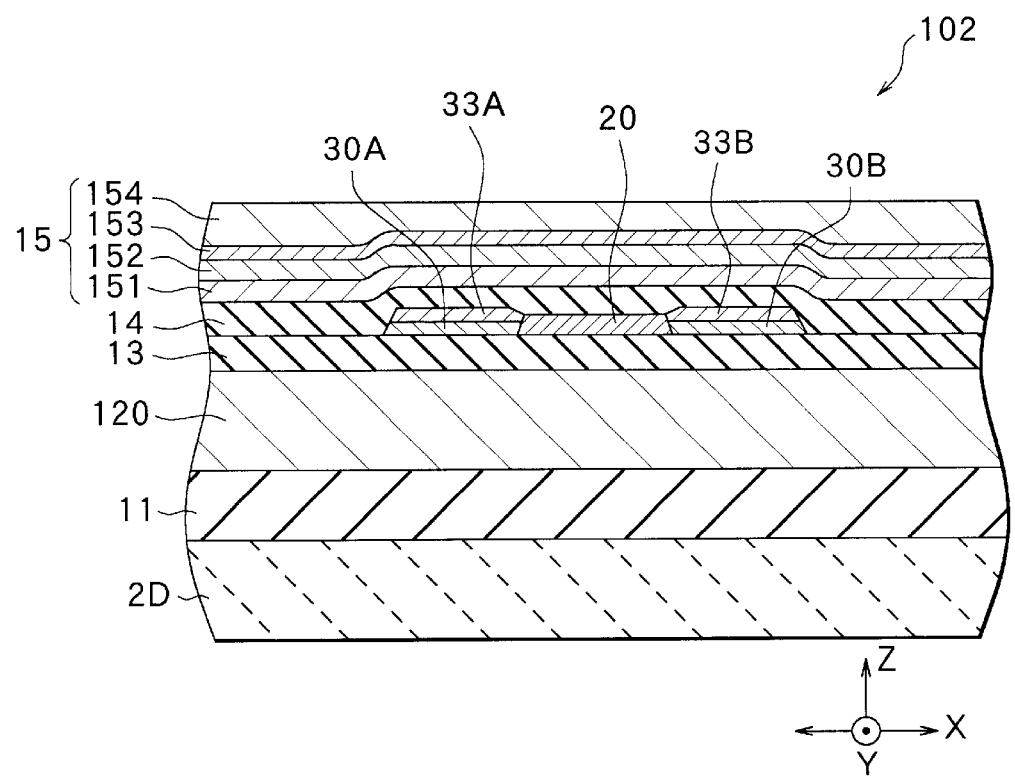
FIG. 17 is a cross sectional view showing a sectional structure of a thin film magnetic head according to a second modification of the first embodiment.

FIG. 17 shows a reproducing head of the thin film magnetic head 102 according to the modification viewed from a magnetic medium, and corresponds to the sectional surface taken along the line VI—VI of FIG. 4. As shown in FIG. 17, in the modification, a first shield layer 120 has a single-layer structure, and is made of the above-mentioned high-magnetic-permeability magnetic material. The first shield layer 120 is, for example, 1 μm to 3 μm in thickness. That is, the direction of magnetization throughout the first shield layer 120 can be freely changed.

In the modification, the direction of magnetization of a region of the second shield layer 15 near the MR film 20 is controlled, but the direction of magnetization of the first shield layer 120 is not at all controlled. Therefore, an effect for preventing a change in output of the MR element 1C slightly declines, compared with the above first embodiment. However, as the direction of magnetization throughout the first shield layer 120 can be freely changed, an undesired magnetic flux easily flows to the first shield layer 120, and thereby, the shield effect for preventing an undesired magnetic field from reaching to the MR film 20 is improved.

[Second Embodiment]

Next, a second embodiment of the invention will be described. A thin film magnetic head 103 according to the embodiment has the same configuration of the thin film magnetic head 1 described in the above first embodiment, except that the magnetization stabilizing layers are made of hard magnetic material, instead of antiferromagnetic material.

Figure 18:
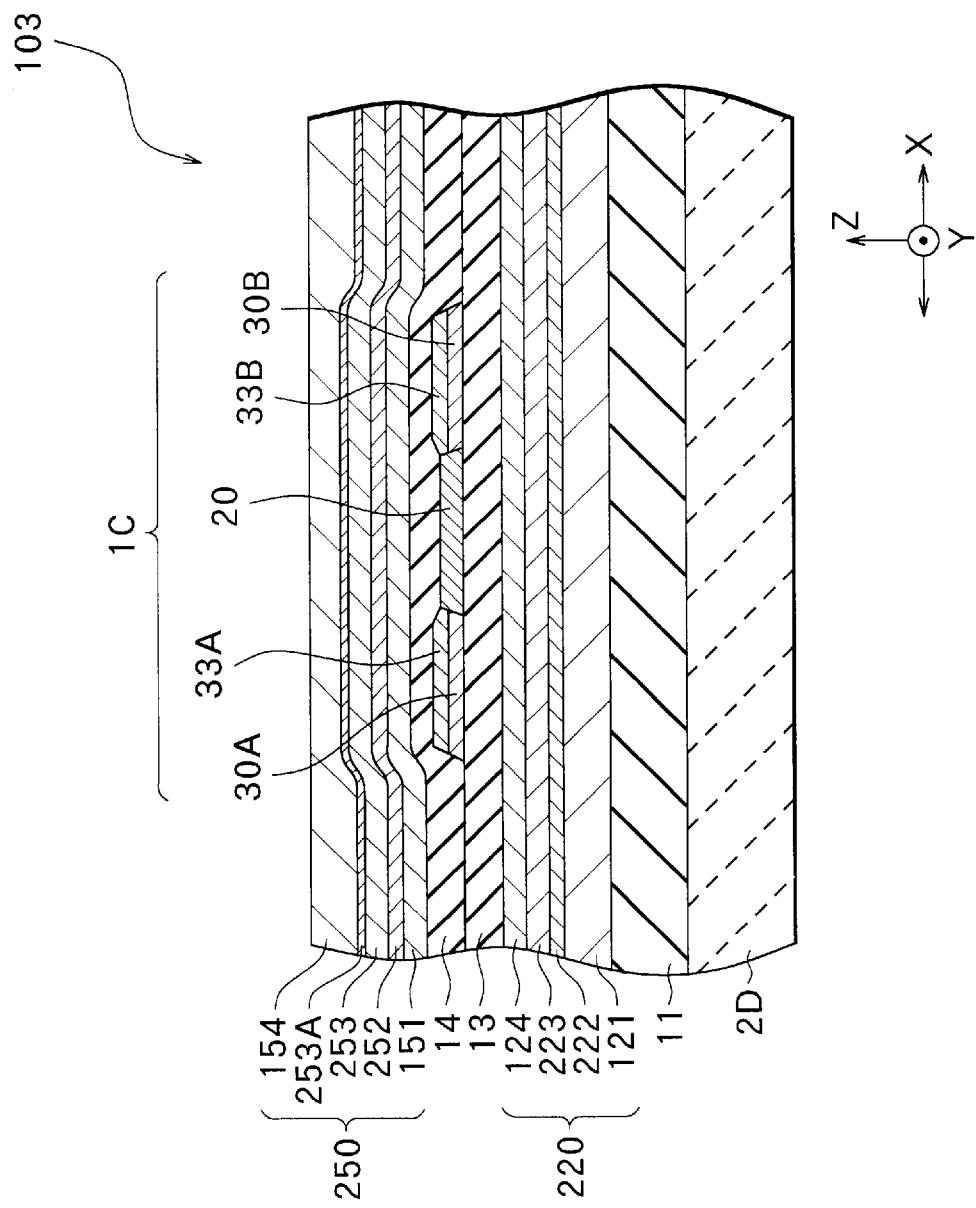
FIG. 18 is a cross sectional view showing a sectional structure of a thin film magnetic head according to a second embodiment.

FIG. 18 shows a reproducing head of the thin film magnetic head 103 according to the embodiment viewed from a magnetic medium, and corresponds to a sectional surface taken along the line VI—VI of FIG. 4. In the drawing of the embodiment, the same components as the components of the first embodiment shown in FIGS. 1 though 15 are denoted by the same numerals thereon, and will not be further explained.

A first shield layer 220 according to the embodiment includes the outer layer 121, an auxiliary layer 222, a magnetization stabilizing layer 223 and the inner layer 124 in order from the insulating layer 11. The configurations of the outer layer 121 and the inner layer 124 are the same as those in the first embodiment.

The magnetization stabilizing layer 223 is, for example, 15 to 100 nm in thickness and is made of hard magnetic material, and more specifically, CoPt (a cobalt-platinum alloy), CoPtCr (a cobalt-platinum-chromium alloy), NdFeB (a neodymium-iron-boron alloy), SmCu (an antimony-copper alloy) or the like. The auxiliary layer 222 is, for example, 1 nm to 10 nm in thickness, and is made of, for example, Cr. The auxiliary layer 222 is provided so as to allow the magnetization stabilizing layer 223 to function as a permanent magnet.

The magnetization stabilizing layer 223 of the first shield layer 220 is almost fixed in the direction X. The influence of magnetization of the magnetization stabilizing layer 223 reaches to the inner layer 124 located next to the magnetization stabilizing layer 223, so the direction of magnetization of the inner layer 124 is almost fixed in the direction X. That is, the magnetization stabilizing layer 223 of the first shield layer 220 has a function for almost fixing the direction of magnetization of the inner layer 124 in the direction X. Further, the auxiliary layer 222 is provided between the outer layer 121 and the magnetization stabilizing layer 223, so the direction of magnetization of the outer layer 121 is never fixed. That is, the direction of magnetization of the outer layer 121 of the first shield layer 220 can be freely changed.

Further, the second shield layer 250 according to the embodiment includes the inner layer 151, an auxiliary layer 252, a magnetization stabilizing layer 253, an isolating layer 253A and the outer layer 154 in order from the insulating layer 11. The configurations of the inner layer 151 and the outer layer 154 are the same as those in the first embodiment.

The magnetization stabilizing layer 253 of the second shield layer 250 is made of the above-mentioned hard magnetic material, and is, for example, 15 nm to 100 nm in thickness. The auxiliary layer 252 is, for example, 1 nm to 10 nm in thickness, and is made of, for example, Cr. The auxiliary layer 252 is provided so as to allow the magnetization stabilizing layer 253 to function as a permanent magnet. The isolating layer 253A is made of, for example, Ta, and is, for example, 1 nm to 10 nm in thickness. The isolating layer 253A is provided to prevent the direction of magnetization of the outer layer 154 from being fixed by the magnetization of magnetization stabilizing layer 253.

The direction of magnetization of the magnetization stabilizing layer 253 of the second shield layer 250 is almost fixed in the direction X. The influence of magnetization of the magnetization stabilizing layer 253 reaches to the inner layer 151 neighboring to the magnetization stabilizing layer 253 (with the auxiliary layer 252 in between), so the magnetization of the inner layer 151 is almost fixed in the direction X. That is, the magnetization stabilizing layer 253 of the second shield layer 250 has a function for almost fixing the direction of magnetization of the inner layer 151 in the direction X. Further, as the outer layer 154 is isolated from the magnetization stabilizing layer 253 by the isolating layer 253A, no influence of magnetization of the magnetization stabilizing layer 253 reaches to the outer layer 154. That is, the direction of magnetization in the outer layer 154 of the second shield layer 250 is freely changed.

In the embodiment, by the effects of the magnetization stabilizing layers 223 and 253, the directions of magnetization of the inner layer 124 of the first shield layer 220 and the inner layer 151 of the second shield layer 250 are almost fixed in the direction X. Therefore, like the first embodiment, changes in resistance of the MR film 20 resulting from changes in the directions of magnetization of the first and second shield layers 220 and 250 can be prevented. That is, output of the thin film magnetic head 103 can be stabilized.

Moreover, the directions of magnetization of the outer layers 121 and 154 of the first and second shield layers 220 and 250 can be freely changed, so that the shield effect can be fully exerted, as in the case of the first embodiment.

<First Modification>

Next, a first modification of the embodiment will be described. A thin film magnetic head 104 according to the modification has the same configuration of the thin film magnetic head described in the above second embodiment, except for the configuration of the second shield layer. In the drawing of the modification, the same components as the components of the second embodiment shown in FIG. 18 are denoted by the same numerals thereon, and will not be further explained.

Figure 19:
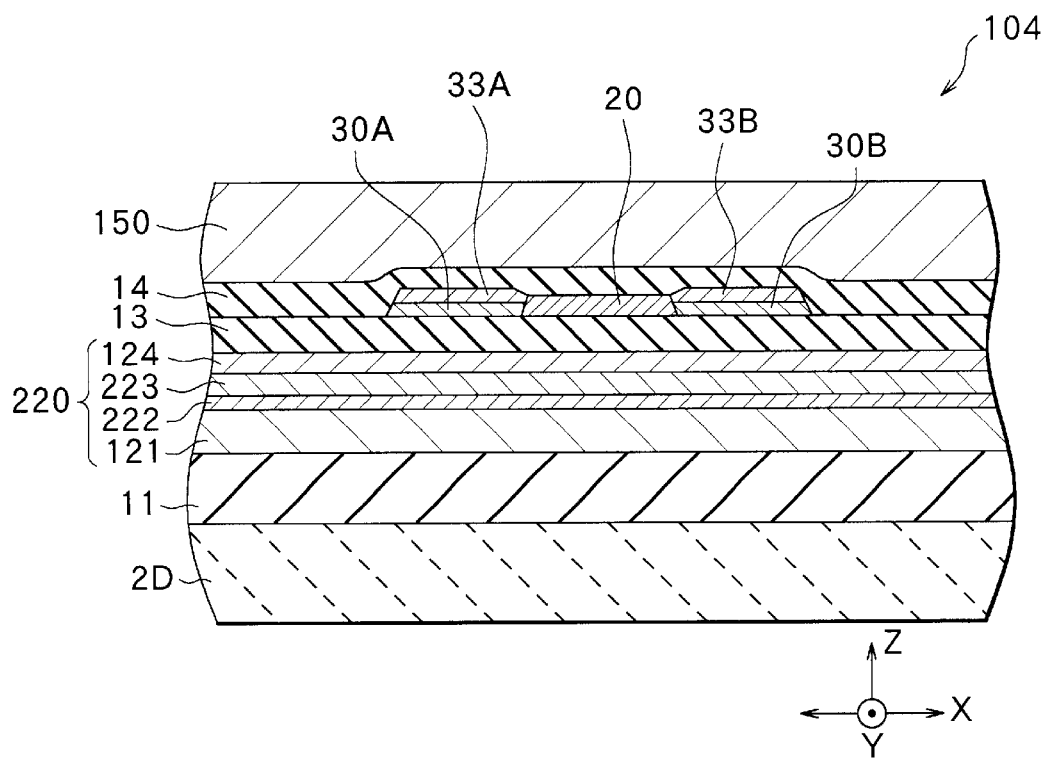
FIG. 19 is a cross sectional view showing a sectional structure of a thin film magnetic head according to a first modification of the second embodiment.

FIG. 19 shows a reproducing head of the thin film magnetic head 104 according to the modification viewed from a magnetic medium, and corresponds to the sectional surface taken along the line VI—VI of FIG. 4. In the modification, the second shield layer 150 has a single-layer structure, and is made of the above-mentioned high-magnetic-permeability magnetic material. The second shield layer 150 is, for example, 1 μm to 3 μm in thickness. That is, the direction of magnetization throughout the second shield layer 150 can be freely changed.

In the modification, the direction of magnetization of a region of the first shield layer 220 near the MR film 20 is controlled, but the direction of magnetization of the second shield layer 150 is not at all controlled. Therefore, an effect for preventing a change in output of the MR element 1C is slightly declined, compared with the above second embodiment. However, as the direction of magnetization throughout the second shield layer 150 can be freely changed, an undesired magnetic flux easily flows to the second shield layer 150, and thereby, the shield effect for preventing an undesired magnetic field from reaching to the MR film is improved.

<Second modification>

Next, a second modification of the embodiment will be described. A thin film magnetic head 105 according to the modification has the same configuration of the thin film magnetic head described in the above second embodiment, except for the configuration of the first shield layer. In the drawing of the modification, the same components as the components of the second embodiment shown in FIG. 18 are denoted by the same numerals thereon, and will not be further explained.

Figure 20:
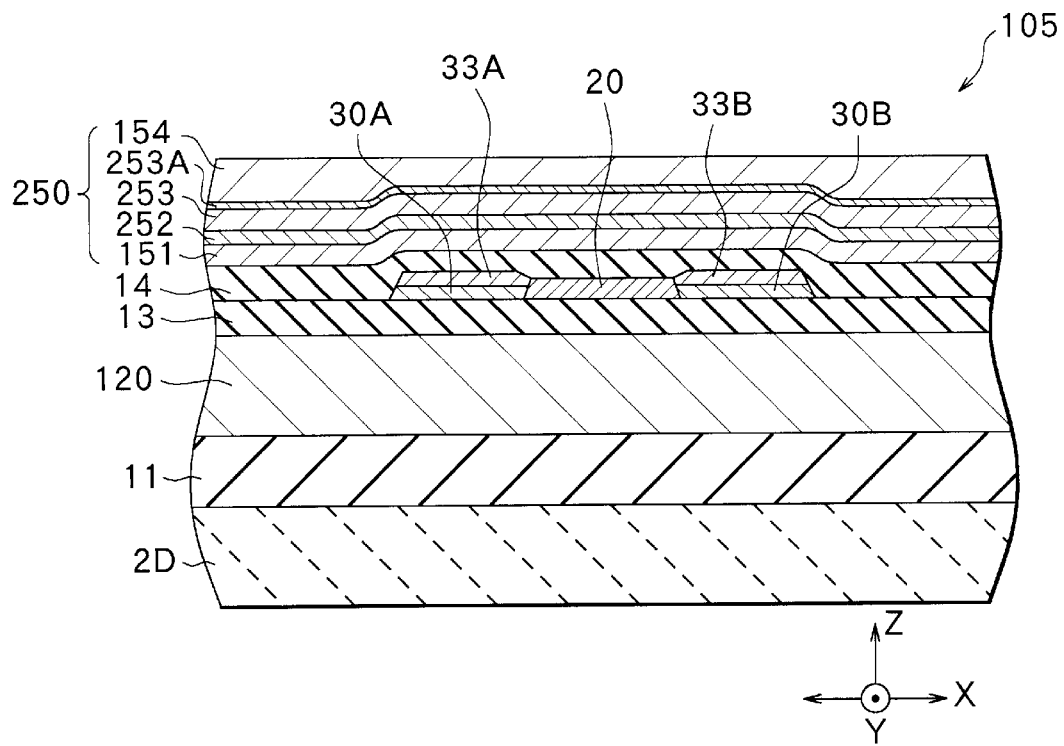
FIG. 20 is a cross sectional view showing a sectional structure of a thin film magnetic head according to a second modification of the second embodiment.

FIG. 20 shows a reproducing head of the thin film magnetic head 105 according to the modification viewed from a magnetic medium, and corresponds to the sectional surface taken along the line VI—VI of FIG. 4. In the modification, the first shield layer 120 has a single-layer structure, and is made of the above-mentioned high-magnetic-permeability magnetic material. The first shield layer 120 is, for example, 1 μm to 3 μm in thickness. That is, the direction of magnetization throughout the first shield layer 120 can be freely changed.

In the modification, the direction of magnetization of a region of the second shield layer 250 near the MR film 20 is controlled, but the direction of magnetization of the first shield layer 120 is not at all controlled. Therefore, an effect for preventing a change in output of the MR element 1C slightly declines, compared with the above second embodiment. However, as the direction of magnetization throughout the first shield layer 120 can be freely changed, an undesired magnetic flux easily flows to the first shield layer 120, and thereby, the shield effect for preventing an undesired magnetic field from reaching to the MR film is improved.

EXAMPLES

Next, specific examples of the invention will be described in detail.

Example 1

As Example 1, the thin film magnetic head 1 shown in FIG. 6 was formed. Firstly, on the base 2D of $Al_2O_3$—TiC, the insulating layer 11 of 2 μm thick was formed of $Al_2O_3$ by means of sputtering, and then on the insulating layer 11, the outer layer 121 of 2 μm thick was formed of $Ni_{80}Fe_{20}$ by means of plating. After that, on the outer layer 121, the underlayer 122 of 5 nm thick was formed of Ta by means of sputtering, and on the underlayer 122, the magnetization stabilizing layer 123 of 20 nm thick was formed of RuMn. Then, on the magnetization stabilizing layer 123, the inner layer 124 of 30 nm thick was formed of, for example, NiFe.

Next, on the inner layer 124 of the first shield layer 12, the first gap film 13 of 10 nm thick was formed of $Al_2O_3$ by means of sputtering. Then, on the first gap film 13, the underlayer 21 of 5 nm thick was formed of Ta by means of sputtering, and on the underlayer 21, the first soft magnetic layer 22A of 3 nm thick was formed of $Ni_{80}Fe_{20}$, and then on the first soft magnetic layer 22A, the second soft magnetic layer 22B of 1 nm thick was formed of CoFe. Then, on the second soft magnetic layer 22B, the nonmagnetic layer 23 of 2.5 nm thick was formed of Cu by means of sputtering, and on the nonmagnetic layer 23, the ferromagnetic layer 24 of 2 nm thick was formed of CoFe, and then on the ferromagnetic layer 24, the antiferromagnetic layer 25 of 20 nm thick was formed of PtMn, and then on the antiferromagnetic layer 25, the cap layer 26 of 5 nm thick was formed of Ta.

Next, a laminated film including the underlayer 21 through the cap layer 26 was patterned by means of ion milling to form the MR film 20 into a shape shown in FIG. 7. On the both sides of the MR film 20, the magnetic domain control films 30A and 30B of 50 nm thick were formed of CoPt by means of sputtering, and the lead layers 33A and 33B of 100 nm thick were formed into a predetermined shape on the magnetic domain control films 30A and 30B, respectively, by means of sputtering.

After forming the lead layers 33A and 33B, the second gap film 14 of 10 nm thick was formed of $Al_2O_3$ by means of sputtering so as to coat the MR film 20, the magnetic domain control films 30A and 30B, and the lead layers 33A and 33B. Next, the inner layer 151 of 30 nm thick was formed of $Ni_{80}Fe_{20}$ on the second gap film 14 by means of sputtering, and on the inner layer 151, the magnetization stabilizing layer 152 of 20 nm thick was formed of RuMn, and then on the magnetization stabilizing layer 152, the isolating layer 153 of 5 nm thick was formed of Ta, and further, on the isolating layer 153, a part of the outer layer 154 was formed of $Ni_{80}Fe_{20}$ only with a thickness of 30 nm. Then, by using the part of the outer layer 154 (of 30 nm thick) as an electrode film, the outer layer 154 of 2 μm thick was formed of $Ni_{80}Fe_{20}$ by means of plating.

On the second shield layer 15, the insulating layer 16, the bottom pole 41, the write gap film 42, the insulating layer 43, the thin film coil 44, the photoresist layer 45, the thin film coil 46, the photoresist layer 47, the top pole 48 and the overcoat layer 49 shown in FIG. 5 were laminated. A portion including the insulating layer 16 through the overcoat layer 49 (that is, the recording head 1B) has no influence on the measurement items on the example, so no detailed description thereof will be given.

Next, in order to induce an exchange coupling between the antiferromagnetic layer 25 and the ferromagnetic layer 24 of the MR film 20, a heat treatment was performed at 250° C. with a magnetic field applied, for example, the direction Y by use of a magnetic field generating apparatus. After that, the temperature was lowered to 200° C., and the direction of the magnetic field applied by use of the magnetic field generating apparatus was changed to the direction X, and an exchange coupling between the inner layer 124 and the magnetization stabilizing layer 123 of the first shield layer 12, and an exchange coupling between the inner layer 151 and the magnetization stabilizing layer 152 of the second shield layer 15 were induced.

Example 2

As Example 2, the thin film magnetic head 101 shown in FIG. 16 was prepared by the same manufacturing method as that of Example 1, except that in the step of forming the second shield layer, the second shield layer 150 of 2 μm thick was formed of $Ni_{80}Fe_{20}$ on the second gap film 14 by means of plating.

Example 3

As Example 3, the thin film magnetic head 102 shown in FIG. 17 was prepared by the same manufacturing method as that of Example 1, except that in the step of forming the first shield layer, the first shield layer 120 of 2 μm thick was formed of $Ni_{80}Fe_{20}$ on the insulating layer 11 by means of plating.

Example 4

As Example 4, the thin film magnetic head 103 shown in FIG. 18 was prepared. First of all, on the base 2D of $Al_2O_3$—TiC, the insulating layer 11 of 2 μm thick was formed of $Al_2O_3$ by means of sputtering, and on the insulating layer 11, the outer layer 121 of 2 μm thick was formed of $Ni_{80}Fe_{20}$ by means of plating. After that, on the outer layer 121, the auxiliary layer 222 of 5 nm thick was formed of Cr by means of sputtering, and on the auxiliary layer 222, the magnetization stabilizing layer 223 of 20 nm thick was formed of CoPt, and then on the magnetization stabilizing layer 223, the inner layer 124 of 30 nm thick was formed of, for example, $Ni_{80}Fe_{20}$.

Next, on the inner layer 124 of the first shield layer 220, like Example 1, the first gap film 13, the underlayer 21, the first soft magnetic layer 22A, the second soft magnetic layer 22B, the nonmagnetic layer 23, the ferromagnetic layer 24, the antiferromagnetic layer 25 and the cap layer 26 were formed in order so as to form the MR film 20. Further, like Example 1, the magnetic domain control films 30A and 30B, and the lead layers 33A and 33B were formed on the both sides of the MR film 20 so that the MR film 20 is sandwiched. Then, like Example 1, the second gap film 14 was formed.

Next, on the second gap film 14, the inner layer 151 of 30 nm thick was formed of $Ni_{80}Fe_{20}$ by means of sputtering, and on the inner layer 151, the auxiliary layer 252 of 10 nm thick was formed of Cr, then on the auxiliary layer 252, the magnetization stabilizing layer 253 of 20 nm thick was formed of CoPt. Then, on the magnetization stabilizing layer 253, the isolating layer 253A of 5 nm thick was formed of Ta, and on the isolating layer 253A, a part of the outer layer 154 was formed of $Ni_{80}Fe_{20}$ only with a thickness of 30 nm. Next, by using the part of the outer layer 154 of 30 nm as an electrode film, the outer layer 154 of 2 μm thick was formed of $Ni_{80}Fe_{20}$ by means of plating.

On the second shield layer 250, like Example 1, the insulating layer 16, the bottom pole 41, the write gap film 42, the insulating layer 43, the thin film coil 44, the photoresist layer 45, the thin film coil 46, photoresist layer 47, the top pole 48 and the overcoat layer 49 were laminated. Then, in order to induce an exchange coupling between the antiferromagnetic layer 25 and the ferromagnetic layer 24 of the MR film 20, a heat treatment was performed at 250° C., with a magnetic field applied, in for example, the direction Y by use of the magnetic field generating apparatus.

Example 5

As Example 5, the thin film magnetic head 104 shown in FIG. 19 was prepared by the same manufacturing method as that of Example 4, except that in the step of forming the second shield layer, the second shield layer 150 of 2 μm thick was formed of $Ni_{80}Fe_{20}$ on the second gap film 14, by means of plating.

Example 6

As Example 6, the thin film magnetic head 105 shown in FIG. 20 was prepared by the same manufacturing method as that of Example 4, except that in the step of forming the first shield layer, the first shield layer 120 of 2 μm thick was formed of $Ni_{80}Fe_{20}$ on the insulating layer 11 by means of plating.

A Covariant (COV) value was measured on each of the thin film magnetic heads prepared in the above manner. The results are shown in Table 1. In order to determine the COV value, a signal magnetic field was repeatedly applied to each of the thin film magnetic heads, and the head output thereof was measured. The COV value is equal to a standard deviation σ of dispersions in the head output divided by an average of the head output.

TABLE 1

| Example | COV (%) |
| --- | --- |
| 1 | 0.5 |
| 2 | 2.0 |
| 3 | 1.5 |
| 4 | 0.5 |
| 5 | 2.0 |
| 6 | 1.5 |
| Comparison | 10.0 |

[Comparison]

As a comparison with the examples, a thin film magnetic head including the first shield layer 12 and the second shield layer 15 each having a single-layer structure was formed of $Ni_{80}Fe_{20}$ with a thickness of 2 μm. The COV value of the thin film magnetic head was measured. The result is also shown in Table 1.

As can be seen from Table 1, in Examples 1 through 6, the COV values were in a range from 0.5% to 2.0%, so the results better than the result of the comparison (10%) were obtained. Especially in Example 1 and Example 4, in which the magnetization stabilizing layers were provided both in the first shield layer and the second shield layer, the COV value of 0.5%, which was the best result, was obtained. Therefore, it is shown that when a magnetization stabilizing layer is provided for at least one of the first shield layer and the second shield layer, the output becomes stable, and when magnetization stabilizing layers are provided for both of the first shield layer and the second shield layer, the output becomes the most stable. Further, compared between Examples 1 through 3 and Examples 4 through 6, it is shown that in either case that the magnetization stabilizing layers are made of antiferromagnetic material or hard magnetic material, equal results can be obtained.

Figure 21:
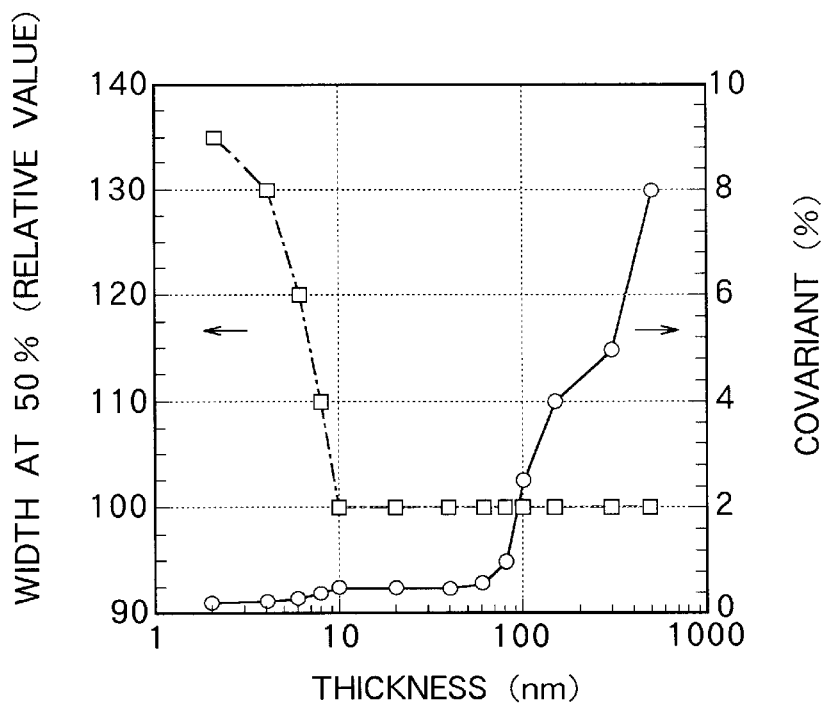
FIG. 21 is a plot of the results of measurement of Covariant values and resolutions in examples of the invention.

Next, in the thin film magnetic head of Example 1, the inner layer 124 of the first shield layer 12 and the inner layer 151 of the second shield layer 15 were varied from 2 nm to 500 nm in thickness, and the Covariant (COV) values and the widths at 50% of output waveform were measured on the thin film magnetic heads including the inner layers 124 and 151 with various thicknesses. The results are shown in FIG. 21. The width at 50% of output waveform was determined from the average of widths at 50% of signal waveforms in the case where a signal magnetic field was repeatedly applied to each of the thin film magnetic heads, and the head output thereof was measured. The width at 50% of output waveform corresponds to the resolution of reproducing head.

As can be seen from FIG. 21, it is shown that when the inner layers 124 and 151 were 10 nm or over in thickness, the widths at 50% of output waveform were almost uniform, and when the inner layers 124 and 151 were less than 10 nm in thickness, the widths of output waveform became larger. It is because when the inner layers 124 and 151 are too thin in thickness, the directions of magnetization of the inner layers 124 and 151 are completely fixed, resulting in no possibility to change the directions of magnetization of the inner layers 124 and 151, and thereby, the shield effects of the first shield layer 12 and the second shield layer 15 slightly declines.

Further, when the inner layers 124 and 151 were 300 nm or less in thickness, the COV values fell within the acceptable limit of 5% or less, but when the inner layers 124 and 151 were more than 300 nm in thickness, the COV values were more than 5%. It is because when the inner layers 124 and 151 are too thick in thickness, an exchange coupling cannot reach to regions of the inner layers 124 and 151 near the MR film 20, and thereby, the directions of magnetization of the regions near the MR film 20 will be changed.

That is, as can be seen in FIG. 21, it is shown that when the thickness of the inner layer 124 of the first shield layer 12 and the thickness of the inner layer 151 of the second shield layer 15 are from 10 nm to 300 nm inclusive, a much better COV value can be obtained, and the resolution can be improved by a narrower width at 50% of output waveform.

Figure 22:
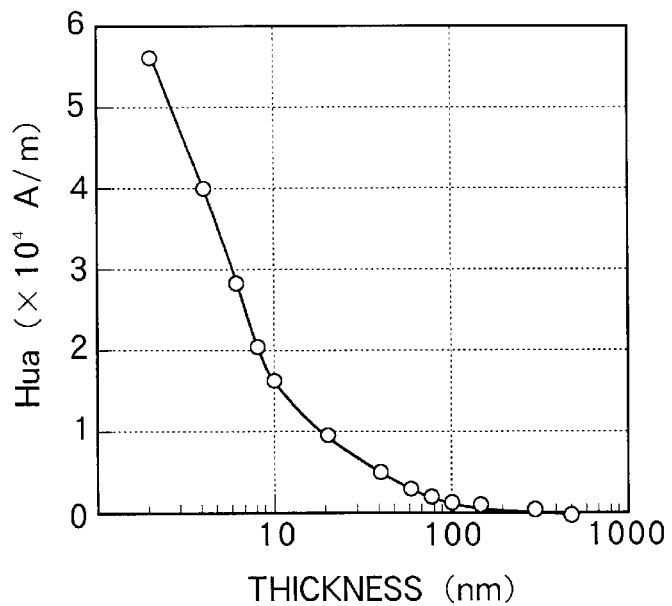
FIG. 22 is a plot of the results of measurement of uniaxially anisotropic magnetic fields in examples of the invention.

FIG. 22 is a plot of the results of measurement of uniaxially anisotropic magnetic fields (Hua) in the inner layers 124 and 151, when the inner layer 124 of the first shield layer 12 and the inner layer 151 of the second shield layer 15 were varied from 2 nm to 500 nm in thickness.

As can be seen in FIG. 22, it is shown that the thinner the thicknesses of the inner layers 124 and 151 are, the larger the uniaxially anisotropic magnetic fields become. On the contrary, it is shown that the thicker the thicknesses of the inner layers 124 and 151 are, the smaller the uniaxially anisotropic magnetic fields become, and when the inner layers 124 and 151 are 500 nm or over, the uniaxially anisotropic magnetic fields become nearly 0. It is because the thinner the thicknesses of the inner layers 124 and 151 are, more strictly the direction of magnetization is controlled, and the thicker the thicknesses of the layers 124 and 151 are, more possibility that the direction of magnetization is changed arises.

The uniaxially anisotropic magnetic fields corresponding to preferable thicknesses (10 nm to 300 nm inclusive) of the inner layers 124 and 151 shown in FIG. 21 are approximately 480 A/m (6 Oe) to 15900 A/m (20 Oe). That is, it is shown that when the uniaxially anisotropic magnetic field is within a range of 480 A/m to 15900 A/m, the COV value can be controlled within a preferable range, and the thin film magnetic head is capable of high-density recording.

Although the invention is described above by referring to the embodiments and examples, the invention is not only applicable for these embodiments and examples but also for various modifications. For example, the magnetization stabilizing layer of the first shield layer may be made of antiferromagnetic material, and the magnetization stabilizing layer of the second shield layer may be made of hard magnetic material, and vice versa.

In addition, the magnetization stabilizing layer in the first shield layer or the second shield layer may be formed only in a local region corresponding to the MR film.

Further, in the above-described embodiments, the antiferromagnetic layer 25 of the MR film 20 is made of heat-treatment type antiferromagnetic material, but the non-heat-treatment type antiferromagnetic material may be used. In this case, without heat treatment, an exchange coupling can be induced on the interface between the antiferromagnetic layer 25 and the ferromagnetic layer 24.

Still further, in the above-described embodiment, the magnetic domain control films 30A and 30B are made of hard magnetic material, but may be made of a laminate having an antiferromagnetic film and a ferromagnetic film. When the antiferromagnetic film is made of heat-treatment type antiferromagnetic material, a heat treatment is required to induce an exchange coupling between the antiferromagnetic film and the ferromagnetic film. When the antiferromagnetic film is made of non-heat-treatment type antiferromagnetic material, no heat treatment is required.

Further, the MR film of the thin film magnetic head 1 is not limited to the spin valve film, and the MR film may be any other types of films such as a GMR film, an AMR film and a TMR (tunnel-type magnetoresistive) film. The thin film magnetic head 1 may be a head for reproducing only, a magnetic sensor or a memory.

As described above, in the thin film magnetic head and the method of manufacturing the thin film magnetic head according to the invention, at least one of the first and second shield layers includes an inner layer having a controlled direction of magnetization, a magnetization stabilizing layer controlling the direction of magnetization of the inner layer, and an outer layer having a freely changeable direction of magnetization, laminated in order from a functional film, so the direction of magnetization of a region of at least one of the first and second shield layers near the functional film can be controlled to obtain stable output of the thin film magnetic head. Further, the outer layer can capture an undesired magnetic field, so even if a space between the first shied layer and the second shield layer becomes narrower for higher density, the thin film magnetic head can prevent the undesired magnetic field from reaching to the functional film. That is, the thin film magnetic head is capable of higher-density recording, and obtaining stable output.

Further, when the thickness of the inner layer is from 10 nm to 300 nm inclusive, output of the thin film magnetic head can be stabilized, and a resolution capable of the higher-density recording can be obtained.

Moreover, when the magnetization stabilizing layer contains an antiferromagnetic material or a hard magnetic material, the direction of magnetization of the inner layer can be easily controlled.

Further, when an intermediate layer is provided between the magnetization stabilizing layer and the outer layer, only the direction of magnetization of the inner layer can be controlled, and the direction of magnetization of the outer layer can be freely changed.

In addition, when the direction of magnetization of the inner layer is nearly parallel to the direction of a bias magnetic field applied to the functional film by the magnetic domain control film, a magnetic field in the shield layer can reduce an influence on the functional film.

Further, when a first temperature, at which an exchange coupling between the antiferromagnetic layer and the ferromagnetic layer occurs, is different from a second temperature, at which an exchange coupling between the magnetization stabilizing layer and the inner layer occurs, the magnetization of the ferromagnetic layer and the magnetization of the inner layer can be independently controlled.

Moreover, a uniaxially anisotropic magnetic field in the outer layer is closer to 0 than a uniaxially anisotropic magnetic field in the inner layer, the direction of magnetization of the inner layer is hard to be changed, and the direction of the magnetization of the outer layer can be easily changed. That is, the thin film magnetic head is capable of higher-density recording, and obtaining stable output.

Further, in a case where the inner layer and the magnetization stabilizing layer are continuously formed by almost the same means of forming, when the magnetization stabilizing layer is made of antiferromagnetic material, it is easier to induce an exchange coupling between the inner layer and the magnetization stabilizing layer.

Moreover, in a case where the magnetization stabilizing layer and the outer layer are discontinuously formed by different means of forming, when the magnetization stabilizing layer is made of antiferromagnetic material, it can prevent an exchange coupling between the outer layer and the magnetization stabilizing layer from being induced.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:

a functional film having a magnetic transducer function;

a first gap film and a second gap film sandwiching the functional film in between, the first and second gap films each having electrical insulating properties: and a first shield layer and a second shield layer sandwiching the functional film with the first and second gap films in between, respectively, so as to prevent an undesired magnetic field from reaching to the functional film, wherein at least one of the first and second shield layers includes an inner layer having a controlled direction of magnetization, a magnetization stabilizing layer controlling the direction of magnetization of the inner layer and an outer layer having a freely changeable direction of magnetization, laminated in order from the functional film, and wherein an intermediate layer is provided between the magnetization stabilizing layer and the outer layer.

2. The thin film magnetic head according to claim 1, wherein the thickness of the inner layer is from 10 nm to 300 nm inclusive.

3. The thin film magnetic head according to claim 1, wherein the magnetization stabilizing layer contains at least one of an antiferromagnetic material and a hard magnetic material.

4. The thin film magnetic head according to claim 1, further including magnetic domain control films for applying a bias magnetic field to the functional film, the bias magnetic field controlling a magnetic domain of the functional film, and the direction of magnetization of the inner layer is nearly parallel in the same direction or nearly parallel in a reverse direction, with respect to a direction of the bias magnetic field applied to the functional film by the magnetic domain control films.

5. The thin film magnetic head according to claim 1, wherein the functional film includes:

a nonmagnetic layer;

a soft magnetic layer provided on a side of the nonmagnetic layer;

a ferromagnetic layer provided on another side of the nonmagnetic layer opposite to the soft magnetic layer; and an antiferromagnetic layer provided on a side of the ferromagnetic layer opposite to the nonmagnetic layer.

6. The thin film magnetic head according to claim 5, wherein the antiferromagnetic layer and the ferromagnetic layer are formed to induce an exchange coupling therebetween by a heat treatment at a first temperature, and the magnetization stabilizing layer and the inner layer are formed to induce an exchange coupling therebetween by a heat treatment at a second temperature different from the first temperature.

7. A thin film magnetic head comprising:

a functional film having a magnetic transducer function;

a first insulating film and a second insulating film sandwiching the functional film in between; and a first magnetic layer and a second magnetic layer sandwiching the functional film with the first and second insulating films in between, respectively, wherein at least one of the first and second magnetic layers includes an inner layer, a magnetization stabilizing layer, an intermediate layer, and an outer layer, laminated in order from the functional film, and wherein an uniaxially anisotropic magnetic field in the outer layer is closer to zero than an uniaxially anisotropic magnetic field in the inner layer.

8. A method of manufacturing a thin film magnetic film including a functional film having a magnetic transducer function, and a first shield layer and a second shield layer for preventing an undesired magnetic field from reaching to the functional film, the method comprising the steps of:

forming the first shield layer on a base with an insulating layer in between;

forming a first gap film having electrical insulating properties on the first shield layer;

forming the functional film on the first gap film;

forming a second gap film having electrical insulating properties on the functional film; and forming the second shield layer on the second gap film, wherein in the steps of forming the first shield layer and forming the second shield layer, at least one of the first and second shield layers is formed so as to include an inner layer having a controlled direction of magnetization, a magnetization stabilizing layer controlling the direction of magnetization of the inner layer, and an outer layer having a freely changeable direction of magnetization, laminated in order from the functional film, and wherein an intermediate layer is provided between the magnetization stabilizing layer and the outer layer.

9. The method of manufacturing a thin film magnetic head according to claim 8, wherein the magnetization stabilizing layer contains at least one of an antiferromagnetic material and a hard magnetic material.

10. The method of manufacturing a thin film magnetic head according to claim 8, wherein the inner layer and the magnetization stabilizing layer are continuously formed through a substantially same means of forming.

11. The method of manufacturing a thin film magnetic head according to claim 8, wherein the magnetization stabilizing layer and the outer layer are discontinuously formed through different means of forming.

* * * * *